United States Patent
Fung et al.

(10) Patent No.: US 10,140,325 B2
(45) Date of Patent: Nov. 27, 2018

(54) DATA SOURCE IDENTIFICATION MAPPING IN BLENDED DATA OPERATIONS

(71) Applicant: Business Objects Software Limited, Dublin (IE)

(72) Inventors: Alfred Fung, Burnaby (CA); Ali Moosavi, Vancouver (CA); Erik Schmidt, Vancouver (CA); David Mosimann, Westminster (CA); Jung-Rung Han, North Vancouver (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 315 days.

(21) Appl. No.: 14/984,480

(22) Filed: Dec. 30, 2015

(65) Prior Publication Data
US 2017/0193024 A1 Jul. 6, 2017

(51) Int. Cl.
*G06F 7/00* (2006.01)
*G06F 17/30* (2006.01)

(52) U.S. Cl.
CPC .. *G06F 17/30333* (2013.01); *G06F 17/30466* (2013.01); *G06F 17/30554* (2013.01); *G06F 17/30592* (2013.01)

(58) Field of Classification Search
CPC ......... G06F 17/30333; G06F 17/30466; G06F 17/30554; G06F 17/30592; G03F 7/70625; G03F 7/70508
See application file for complete search history.

(56) References Cited

U.S. PATENT DOCUMENTS

| | | | |
|---|---|---|---|
| 5,991,754 A | 11/1999 | Raitto et al. | |
| 7,461,057 B2 | 12/2008 | Radestock et al. | |
| 7,840,607 B2 * | 11/2010 | Henigman | G06F 17/30607 707/751 |
| 2002/0070953 A1 | 6/2002 | Barg et al. | |

(Continued)

OTHER PUBLICATIONS

Extended European Search Report, dated May 19, 2017, from a corresponding foreign application, EP 16002750.4, 10 pages.

(Continued)

*Primary Examiner* — Azam Cheema
(74) *Attorney, Agent, or Firm* — Fountainhead Law Group PC

(57) ABSTRACT

Data blending operations are disclosed configured to blend data from a primary data set and a secondary data set. Primary and secondary data structure models are generated reflecting selected dimensions and measures of the primary and secondary data structure models upon which the data blending operation is to be performed. Each dimension and measure in the primary and secondary data structure models includes a local identifier. Unique global identifiers are assigned to each local identifier of the primary and secondary data structure models. Client queries are generated and communicated to a backend server to perform data blending on the selected dimensions and measures of the primary data set and the secondary data set. The client queries may comprise the global identifiers and mapping information between the global identifiers and local identifiers. The backend system retrieves a resulting data set in response to the data blending operation based on this mapping.

19 Claims, 19 Drawing Sheets

(56) References Cited

U.S. PATENT DOCUMENTS

| | | | |
|---|---|---|---|
| 2006/0116975 A1* | 6/2006 | Gould | G06Q 10/06 |
| 2007/0198601 A1* | 8/2007 | Prahlad | G06F 3/0605 |
| 2009/0006318 A1 | 1/2009 | Lehtipalo et al. | |
| 2009/0313268 A1 | 12/2009 | Folting et al. | |
| 2010/0134501 A1 | 6/2010 | Lowe et al. | |
| 2013/0117217 A1* | 5/2013 | Bhide | G06F 17/30563 |
| | | | 707/602 |
| 2013/0346429 A1 | 12/2013 | Bratz et al. | |
| 2014/0074801 A1 | 3/2014 | Kacher et al. | |
| 2014/0193116 A1 | 7/2014 | Bylander | |
| 2017/0193024 A1 | 7/2017 | Fung et al. | |

OTHER PUBLICATIONS

Kristi Morton et al., "Dynamic Workload Driven Data Integration in Tableau", Proceedings of the 2012 International Conference on Management of Data, SIGMOD '12, May 20-24, 2012, 10 pages.

Alan Eldridge, "Best Practices for Designing Efficient Tableau Workbooks", Tableau Workbooks, Jan. 31, 2013 2013, pp. 1-33.

Pit Fender, "Section 1.1, Motivation" In: Efficient Memorization Algorithms for Query Optimization, Dec. 11, 2014,Anchor Publishing, Hamburg, pp. 15-17.

Grant Fritchey, "Chapter 9: Execution plan Cache Analysis" In: "SQL Server 2012 Query Performance Tuning", Jun. 19, 2012, Apress, Berkely, CA, pp. 241-279.

Anonymous, "Artifact (software development)", Wikipedia, Oct. 28, 2015, retrieved from the Internet: URL: https://en.wikipedia.org/w/index.php?title=Artifact_(software_development)&oldid=687975121, pp. 1-2.

Anonymous, "Subset", Wikipedia, Dec. 17, 2015, retrieved from the Internet: URL:https://en.wikipedia.org/w/index.php?title=Subset&oldid=695672410, pp. 1-4.

Tableau Software: Data Blending: Uncovering the Magic and Mystery (In English), YouTube, Nov. 20, 2014, Retrieved from the Internet: URL:https://www.youtube.com/watch?v=6GMri9oXLfw.

European Search Report, dated Mar. 24, 2017, from a corresponding foreign application, EP 16002728.0, 18 pages.

Internet article entitled "What is Data Blending?", retrieved from http://www.datawatch.com/what-is-data-blending/ Printed Dec. 28, 2015.

Non Published U.S. Appl. 15/391,153, filed Dec. 27, 2016.

* cited by examiner

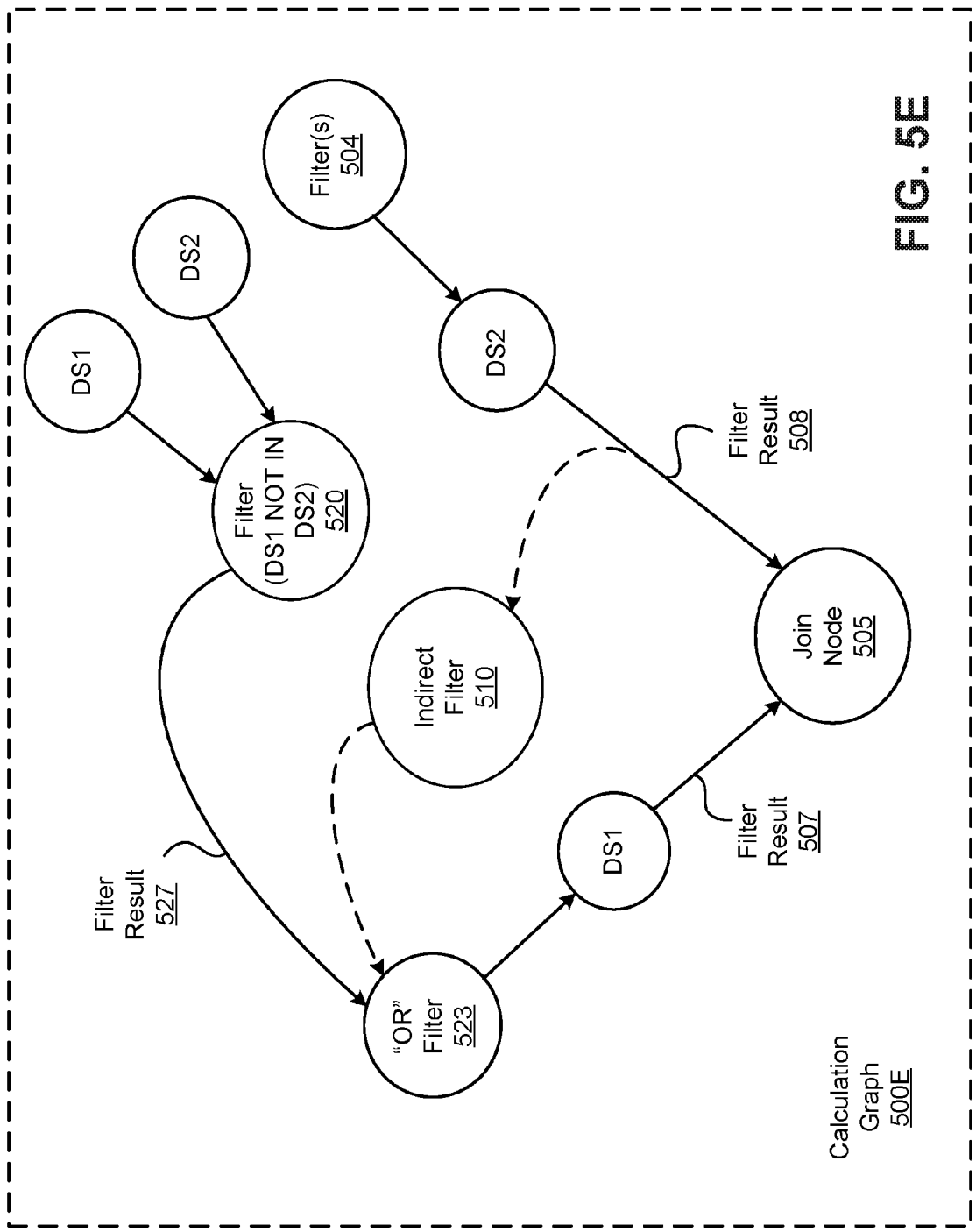

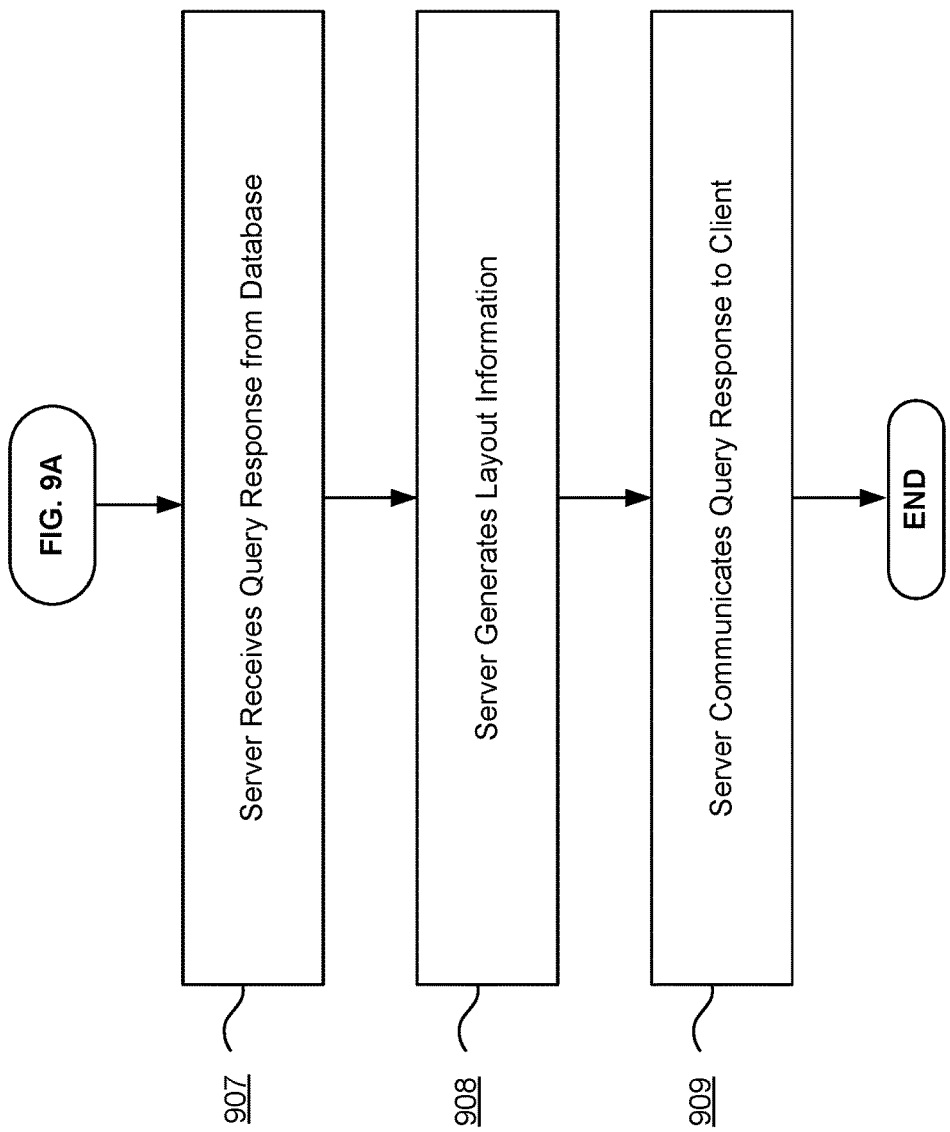

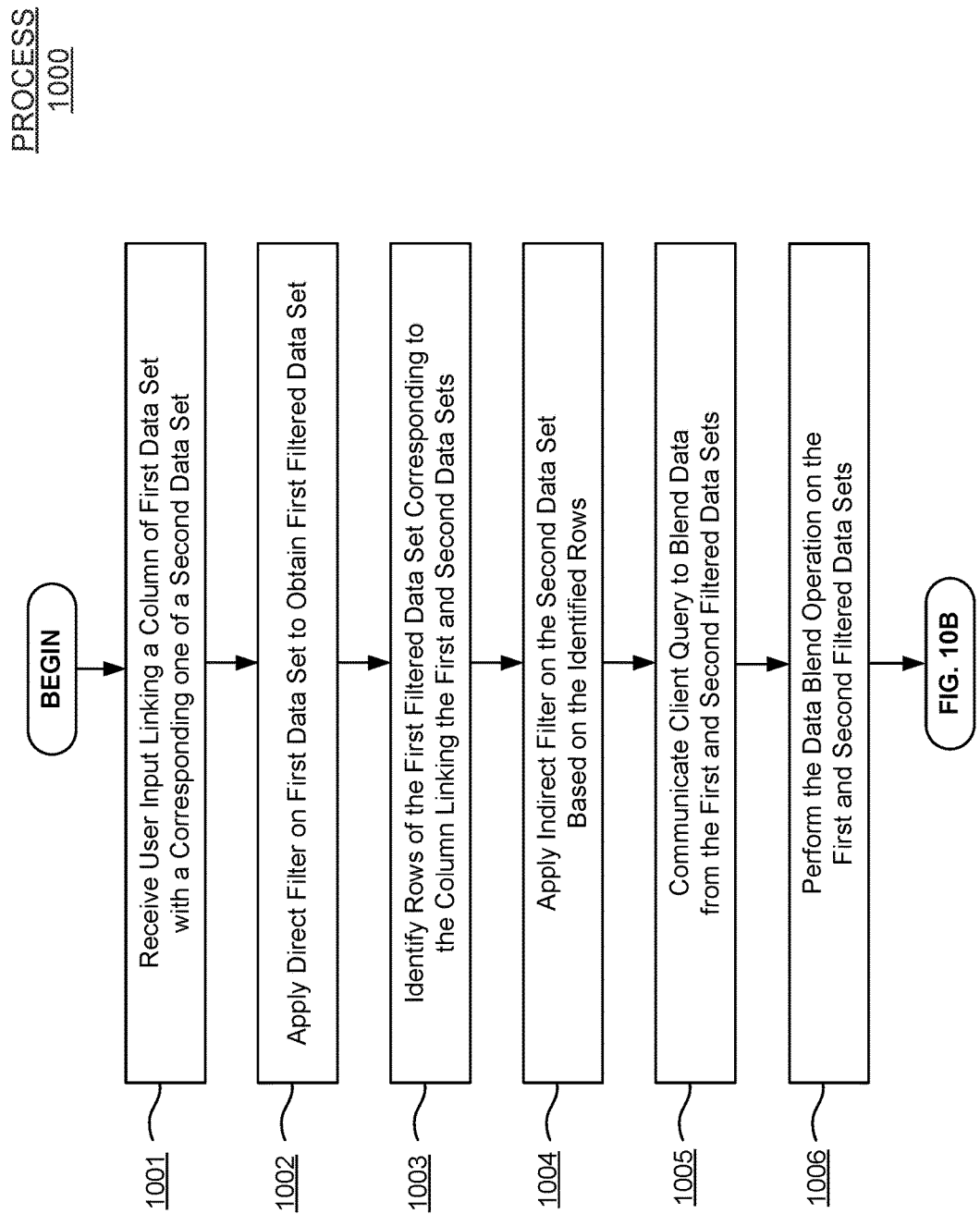

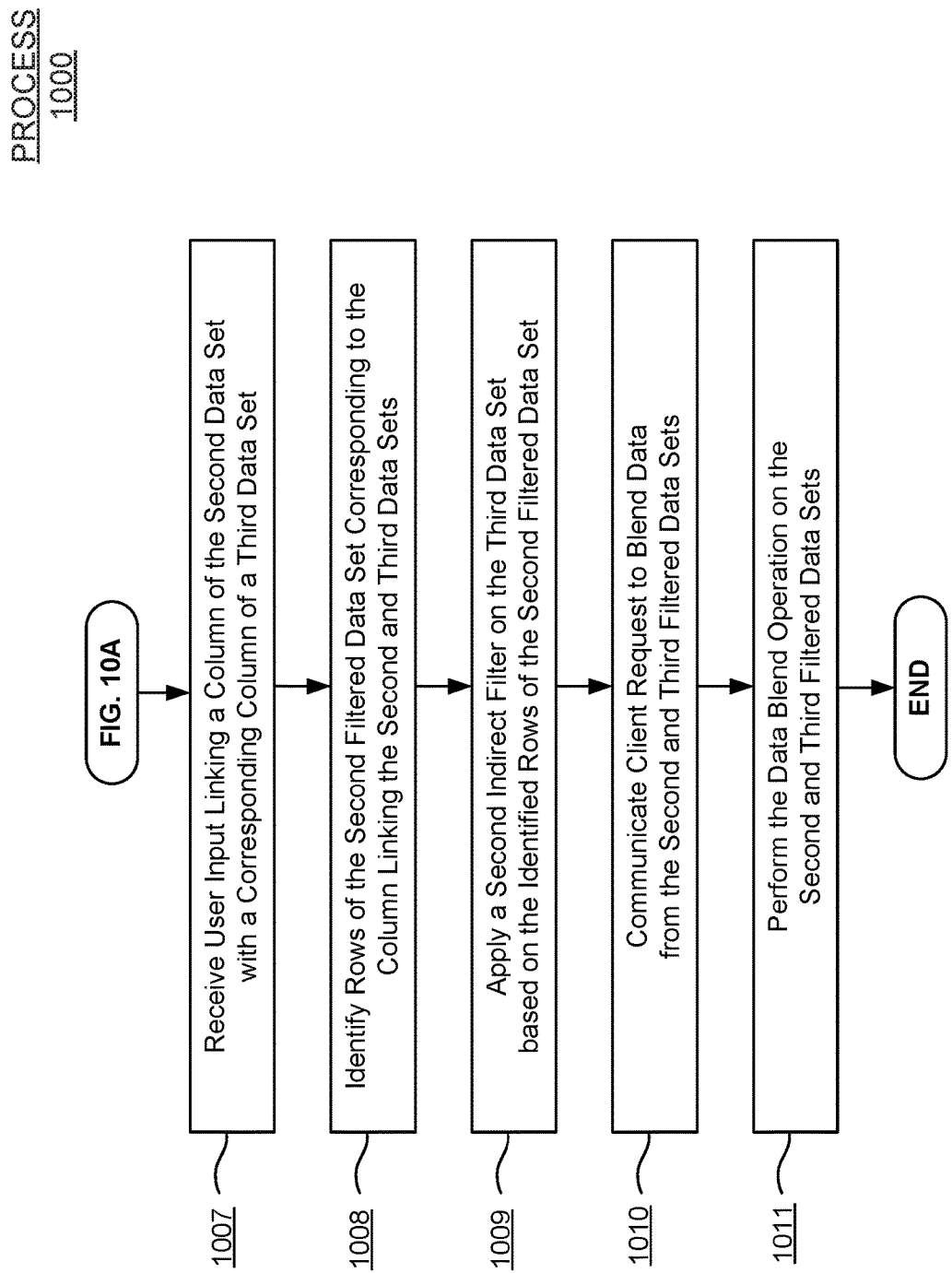

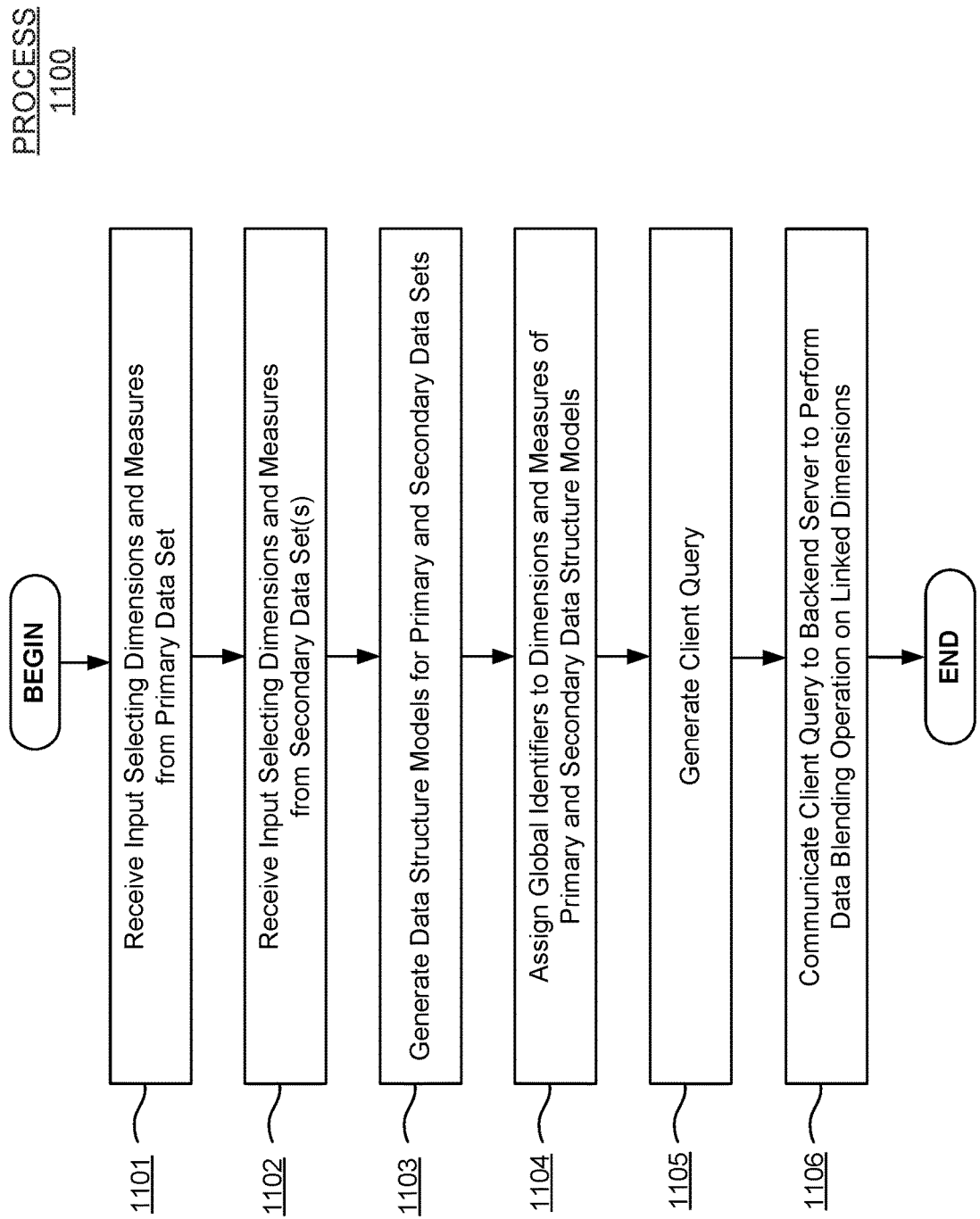

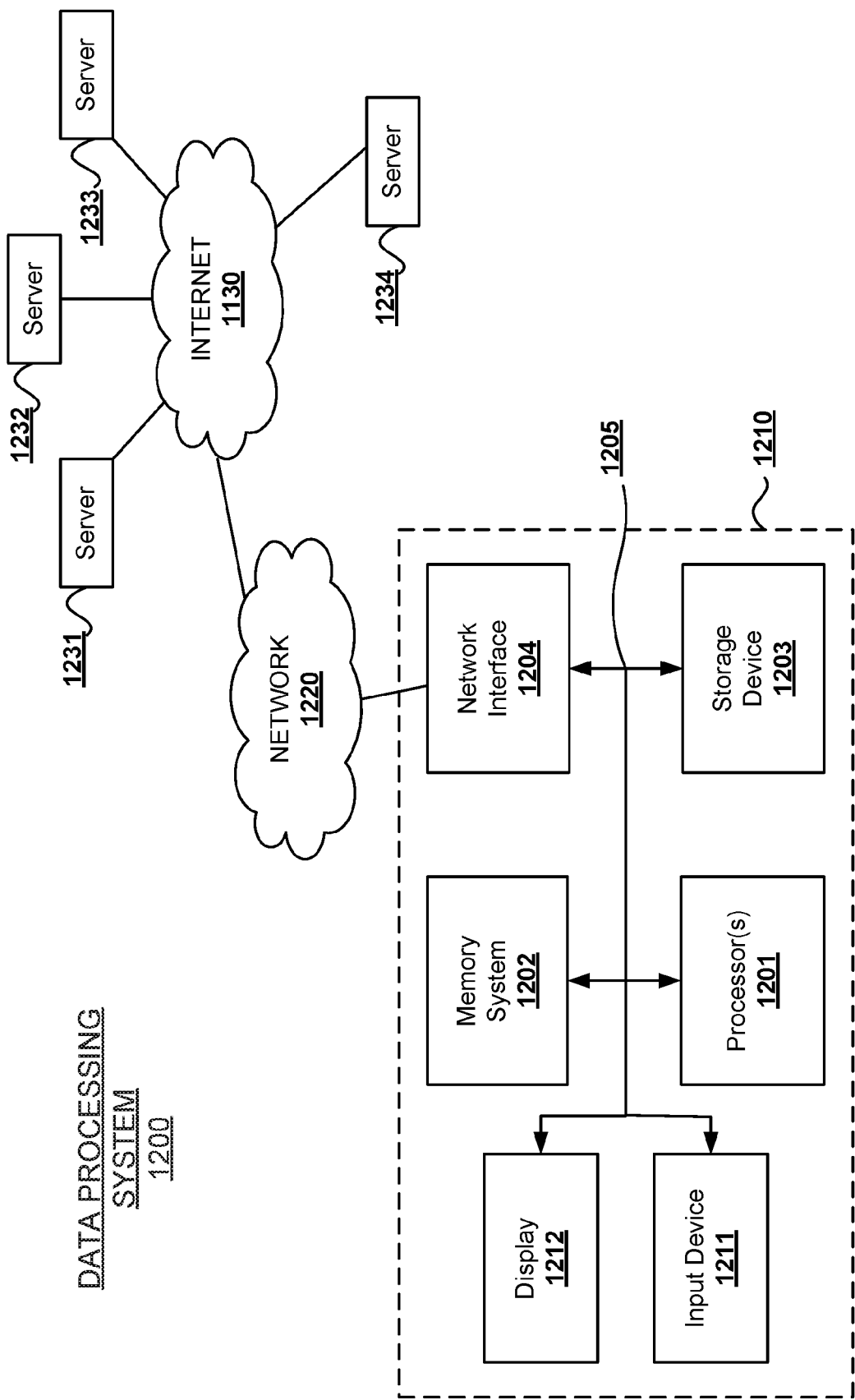

TABLE 1

|   | COUNTRY | CITY | YEAR | CITY POPULATION |
|---|---------|------|------|-----------------|
| 1. | Canada | Vancouver | 2013 | 2.1 |
| 2. | Canada | Victoria | 2013 | 0.7 |
| 3. | Canada | Victoria | 2014 | 0.8 |
| 4. | Canada | Vancouver | 2014 | 2.2 |
| 5. | Australia | Sydney | 2013 | 4.6 |
| 6. | Australia | Sydney | 2014 | 4.8 |
| 7. | Spain | Barcelona | 2014 | 14.1 |

FIG. 13

DATA SOURCE IDENTIFICATION MAPPING IN BLENDED DATA OPERATIONS

TECHNICAL FIELD

At least certain embodiments disclosed herein relate generally to data processing in a computer network, and in particular to data source identification mapping in blended data operations across multiple data sets.

BACKGROUND

Merging data from database tables (or other data structures) in a database system is well known. Merging data operations can be performed on two or more database structures to merge their respective data together. But data merging suffers from a number of deficiencies. When data is merged from columns or rows of two or more data structures, one of the columns or rows must function as the foreign key for the merge operation. As a result, unique values are required to perform a data merge. That is, when a particular column or row is used as the linking element in a data merge operation, its values cannot be repeated.

In addition, the entire data set of database tables (or other data structures) involved in a data merge operation has to be queried from the database, processed, and then the entire resulting data set must be written back to the database. The resulting data set can be very large and unwieldy. For example, if there are 1000 columns in a particular database table to be merged, the resulting data set will be very large. Data processing on the resulting data set in a data merge operation therefore incurs significant expense in terms of memory space, network bandwidth, and data processing resources.

Data blending, on the other hand, provides capabilities that are unavailable in data merging. Data blending is a process used to extract data from multiple data sources to potentially discover correlations between different data sets. Data blending begins with gathering data from various different sources. Once these sources are located and loaded, the data is combined into a functioning data set while excluding any unnecessary data. In data blending, any user-defined subset of two or more columns from two or more data sets can be blended together at any specified granularity without requiring unique values for the blended columns or rows and without requiring processing the entire database table for each of the data sets.

SUMMARY

The embodiments described herein include improved methods, systems and computer readable media for data source identification mapping in blended data operations. In one embodiment a method is disclosed comprising receiving input, at a client graphical interface of a client system, selecting a dimension or measure from a primary data set of a plurality of data sets and selecting a dimension or measure from at least one secondary data set of the plurality of data sets to be displayed in a visualization in the client interface, where one or more dimensions of the primary data set are linked with one or more dimensions of the secondary data set, generating a primary data structure model representing the selected dimensions and measures for the primary data set and a secondary data structure model representing the selected dimensions and measures for the secondary data set, where each dimension and measure in the primary data structure model and the secondary data structure model includes a local identifier, assigning a global identifier to each dimension and measure in the primary data structure model and the secondary data structure model, generating a client query comprising the global identifiers and mapping information between the global identifiers and the local identifiers of the primary and secondary data structure models, and communicating the client query to a server, where the server is configured to perform the data blending operation on each selected dimension of the one or more dimensions of the primary data set that is linked with the one or more dimensions of the secondary data set in response to the input.

In one embodiment, the server is further configured to access a database to retrieve a resulting data set in response to the data blending operation, and return the resulting data set to the client system for rendering the visualization in the client interface.

In one embodiment, the server determines which data to include in the resulting data set based on the mapping information between the global identifiers and the local identifiers of the primary and secondary data structure models. Each of the global identifiers may be unique across the plurality of data sets.

In one embodiment, the data blending operation includes generating a runtime artifact representing a calculation graph for the data blending operation. The data blending operation may be performed in a background process and may be performed without requiring unique values for the dimensions or measures of the primary and secondary data sets and without processing an entire database table for each of the primary and secondary data sets.

In one embodiment, the method further comprises updating the visualization in the client interface based on data provided by the server in response to the client query.

In another embodiment, a system is disclosed comprising a server in communication with a database, a computer system in communication with the server over a network, the computer system comprising a processor and a system memory in communication with the processor via a communication medium. The system memory may be configured to store programmed computer code, which when executed by the processor, causes the processor to perform data blending operations comprising receiving input, at a client interface comprising a graphical display of a client system, selecting a dimension or measure from a primary data set of a plurality of data sets and selecting a dimension or measure from at least one secondary data set of the plurality of data sets to be displayed in a visualization in the client interface, where one or more dimensions of the primary data set are linked with one or more dimensions of the secondary data set, generating a primary data structure model representing the selected dimensions and measures for the primary data set and a secondary data structure model representing the selected dimensions and measures for the secondary data set, where each dimension and measure in the primary data structure model and the secondary data structure model includes a local identifier, assigning a global identifier to each dimension and measure in the primary data structure model and the secondary data structure model, generating a client query comprising the global identifiers and mapping information between the global identifiers and the local identifiers of the primary and secondary data structure models, and communicating the client query to a server, where the server is configured to perform the data blending operation on each selected dimension of the one or more dimensions of the primary data set that is linked with the one or more dimensions of the secondary data set in response to the input.

In one embodiment, the server determines which data to include in the resulting data set based on the mapping information between the global identifiers and the local identifiers of the primary and secondary data structure models. The data blending operation may include generating a runtime artifact representing a calculation graph for the data blending operation.

In yet other embodiments, a computer readable storage medium is disclosed that is configured to perform operations comprising receiving input, at a client interface comprising a graphical display of a client system, selecting a dimension or measure from a primary data set of a plurality of data sets and selecting a dimension or measure from at least one secondary data set of the plurality of data sets to be displayed in a visualization in the client interface, where one or more dimensions of the primary data set are linked with one or more dimensions of the secondary data set, generating a primary data structure model representing the selected dimensions and measures for the primary data set and a secondary data structure model representing the selected dimensions and measures for the secondary data set, where each dimension and measure in the primary data structure model and the secondary data structure model includes a local identifier, assigning a global identifier to each dimension and measure in the primary data structure model and the secondary data structure model, generating a client query comprising the global identifiers and mapping information between the global identifiers and the local identifiers of the primary and secondary data structure models, and communicating the client query to a server, where the server is configured to perform the data blending operation on each selected dimension of the one or more dimensions of the primary data set that is linked with the one or more dimensions of the secondary data set in response to the input.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIG. 5E depicts a block diagram of an example embodiment of a calculation graph showing the application of an exclusion filter in indirect filtering according to the techniques described herein.

FIGS. 9A-9B depict example flow charts illustrating an embodiment of a process for performing data blend operations according to the techniques described herein.

FIGS. 10A-10B depict example flow charts illustrating an embodiment of a process for performing indirect filtering in data blend operations according to the techniques described herein.

FIG. 11 depicts an example flow chart illustrating an embodiment of a process of data source identification mapping in data blending operations in accordance with the techniques described herein.

FIG. 12 depicts an example overview block diagram of a data processing system upon which the embodiments described herein may be implemented. FIG. 13 shows a table where values in columns include repeated values.

DETAILED DESCRIPTION

Figure 1:
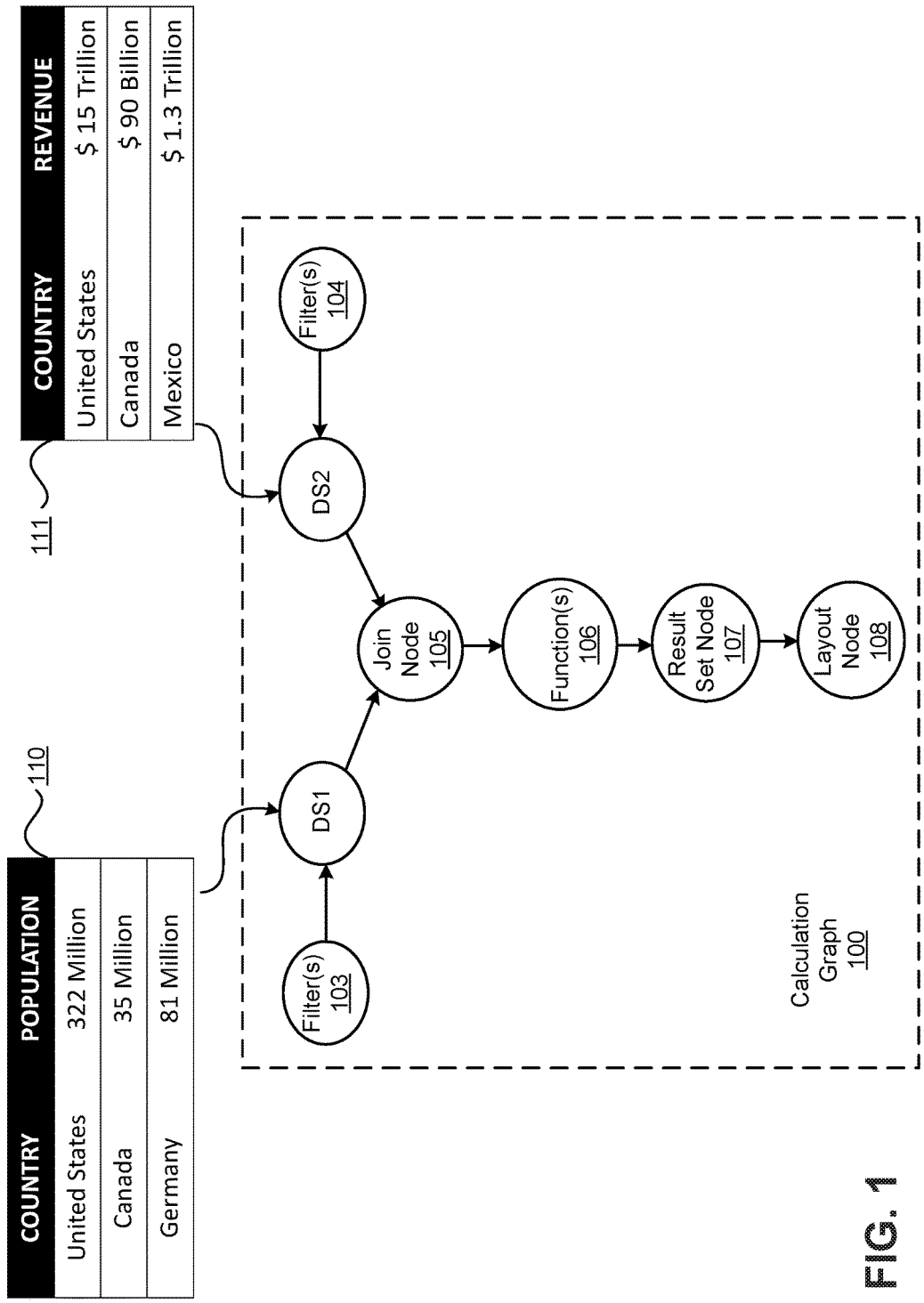
FIG. 1 depicts an example calculation graph generated during a data blend operation according to at least certain embodiments described herein.

Throughout the description, for the purposes of explanation, numerous specific details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the novel principles and techniques described herein.

The novel embodiments and techniques described herein relate to systems, methods, and computer readable media adapted for performing data source identification mapping in data blend operations. In the case where there are 1000 columns in a data set, the blend operation only needs to be performed on the user-specified subset of these data sets. For example, a user may specify a data blend operation on two columns from a first data set and three columns from a second data set. An example of this is shown in Table 1 of FIG. 13 where the values in columns "country", "city" and "year" include repeated values. Only a subset including rows 2, 3, 5 and 6 have been specified for the data blend operation.

Data blending according to the techniques described herein enables users to specify a subset of the columns or rows within a database table (or other data structure) upon which the data blend is to be performed. The subsets can be specified based on the desired end result. While data merge operations operate on the entire database tables using all the columns in both data sets, data blending can be viewed as ad hoc, utilizing only the columns or rows necessary for display in a particular visualization in the client interface at the client system.

It is unnecessary that both database tables that are blended together have the same fields. For example, if a first data set comprises two columns, "population" and "country", and a second data set comprises two columns, "country" and "revenue", the resulting join node may, for example, comprise a data structure with three columns: (1) "country", (2) "population" and (3) "revenue". The columns for "country" from both data sets can be collapsed into a single column and the data values in those columns can be aggregated together. The members for that blended column can be based on the designated join type (discussed below).

Processing of data in a data blend operation involves storing a result set data structures in temporary storage locations during the life cycle of the blend operation—there is no need to store the resulting data set back to the database as required in data merge operations. A blended data structure (referred to herein as a "join node" or "join data structure") can be generated to perform the blending. In at least a preferred embodiment, the join node comprises a result set data structure stored, for example, in local memory. The result set data structures (e.g., tables) comprise runtime artifacts that occur during the data blending operation. The resulting set data structures are not artifacts of any database; hence there is no need to store the resulting data structure back to the database after a blend operation is complete. The results of data blend operations can be used to render one or more visualizations in a display at a client graphical interface. In one embodiment, the result set data structures may comprise local in-memory tables created for the lifecycle of the query to obtain the requisite data for performing the data blend; and to provide a visualization of a particular visualization type specified by the user at the client interface.

FIG. 1 depicts an example calculation graph generated during a data blend operation according to at least certain embodiments described herein. The calculation graph may be utilized by a particular runtime process to perform data blending. Each node in a calculation graph may be generated by a calculation engine (not shown) in a backend server in communication with the client system. Each node may represent a database table (or other data structure), and each database table may comprise an SQL statement. Other database query languages are possible and the embodiments described herein are not limited to any particular one. Further, each node may include a reference to a previous node in the blending process.

A calculation engine ("CE") in the backend server may generate a runtime artifact for each node in the calculation graph. In the illustrated embodiment, calculation graph 100 includes a plurality of nodes including data set node DS1, data set node DS2, filter nodes 103 and 104, join node 105, function nodes 106, result set node 107, and layout node 108. The data set node DS1 comprises a table 110 and data set node DS2 comprises a table 111. In this example, table 110 includes columns "country" and "population" and rows "United States", "Canada" and "Germany". Table 111 includes columns "country" and "revenue" and rows "United States", "Canada" and "Germany".

For data blending, the two or more data sets to be blended can be aggregated and then blended together (also referred to herein as "joined"). Certain columns and rows in table 110 can be specified for data set node DS1 and certain columns and rows in table 111 can be specified for data set node DS2. In addition, one or more filters 103 and 104 can be applied to the data set nodes DS1 and DS2 at the beginning of the data blending process as shown to perform various pre-filtering functions on the data sets (discussed in more detail below).

The data blend calculation can be performed (by the calculation engine at the server) to join the data set nodes DS1 and DS2 at join node 105. Additional functions 106 may then be performed on the resulting data structure of join node 105. For example, ranking or sorting functions 106 can be performed. The backend server can then build a database query to communicate to the database to retrieve a resulting data set at result set node 107. The final node in the calculation graph is referred to as the "layout node", which is the node used to generate layout information based on the selected visualization at the client interface. The calculation engine can then construct the layout node data structure 108.

A query may be constructed at the client system to obtain the necessary information to fill out the data sources for the layout in the visualization at the client display. The layout node 108 contains information for formatting the resulting data set to be displayed at the client interface graphical display according to a particular visualization. This particular query may include a layout component containing information for formatting the output result set (result set node 107) to correspond to the particular user-selected visualization type at the client graphical display. The visualization type may include, for example, a bar chart, pie chart, or other type of graph, etc. The backend server can be configured to provide different layout results corresponding to different selected visualization types at the client interface. The calculation graph can be used to determine what layout information is needed to satisfy the client request and to provide the results to the client in the designated format.

Figure 2:
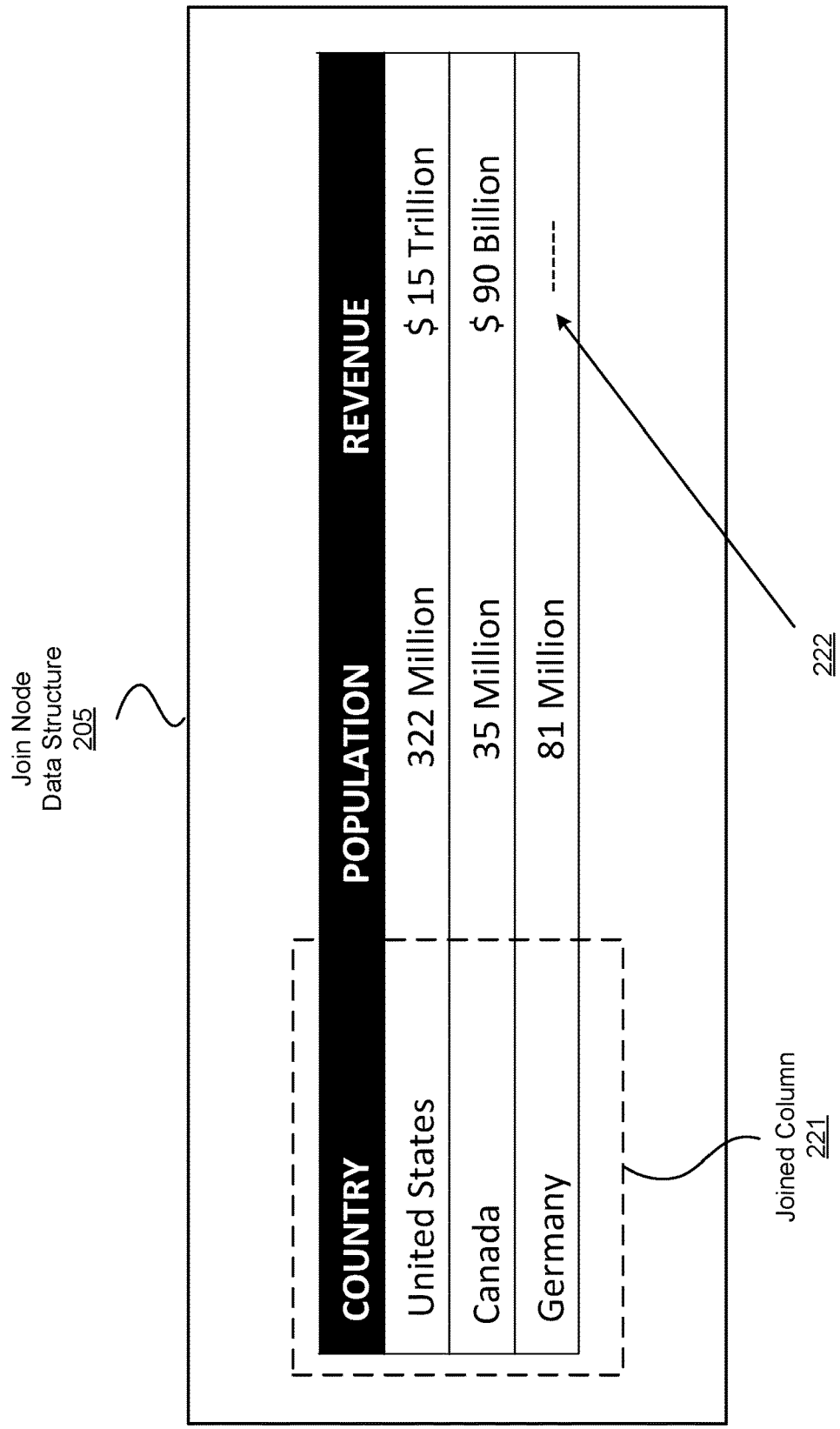
FIG. 2 depicts an example join node data structure generated during a data blend operation according to at least certain embodiments described herein.

FIG. 2 depicts an example join node data structure generated by the data blend operation illustrated in FIG. 1. In this embodiment, join node data structure 205 comprises a joined column 221 upon which the data blend operation has been performed. In this example, "country" in table 110 of data set node DS1 was specified as the column to blend on during the data blending operation. As used herein, the column specified for joining may also be referred to as the "linked column" or "blended column". As discussed above, it does not matter that the rows in the blended result include repeated values.

In one embodiment, the blend operation is adapted to collapse the columns from a primary data set with one or more joined (or linked) columns from one or more secondary data sets. The blend operation is then adapted to aggregate values of the rows in the blended column 221. In this example the "country" column of table 110 of data set node DS1 was specified as the column to be blended on. The primary data set was specified as data set node DS1 comprising table 110. Data set node DS2 comprising table 111 therefore becomes the secondary data set that is blended with the primary data set DS1. In particular, the data in the "country" column from table 111 of data set node DS2 is blended with the data in the "country" column from table 110 of data set node DS1 and then collapsed into the joined column 221.

The example illustrated in FIG. 2 depicts blending on a single column specified in the primary data set. It should be noted, however, that the any number of columns from the primary data set can be specified to blend on. In such a case, instead of collapsing the specified data sets into one column, the data sets would be collapsed into two or more columns because those were the columns specified for blending on.

The two tables 110 and 111 from data set node DS1 and data set node DS2, respectively, are joined at join node 205. The additional columns "population" from table 110 of data set node DS1 and "revenue" from table 111 of data set node DS2 are also brought into the join node data structure 205. In this example, a "left-outer" join data blending operation type is performed (discussed in more detail below). In a left-outer join operation only the rows that exist in the primary data set in table 110 will be output as a result set of the data blend operation. In addition, because there were no "revenue" values for "Germany" in table 111, null value 222 is returned for this row in the join node data structure 205.

Figure 3B:
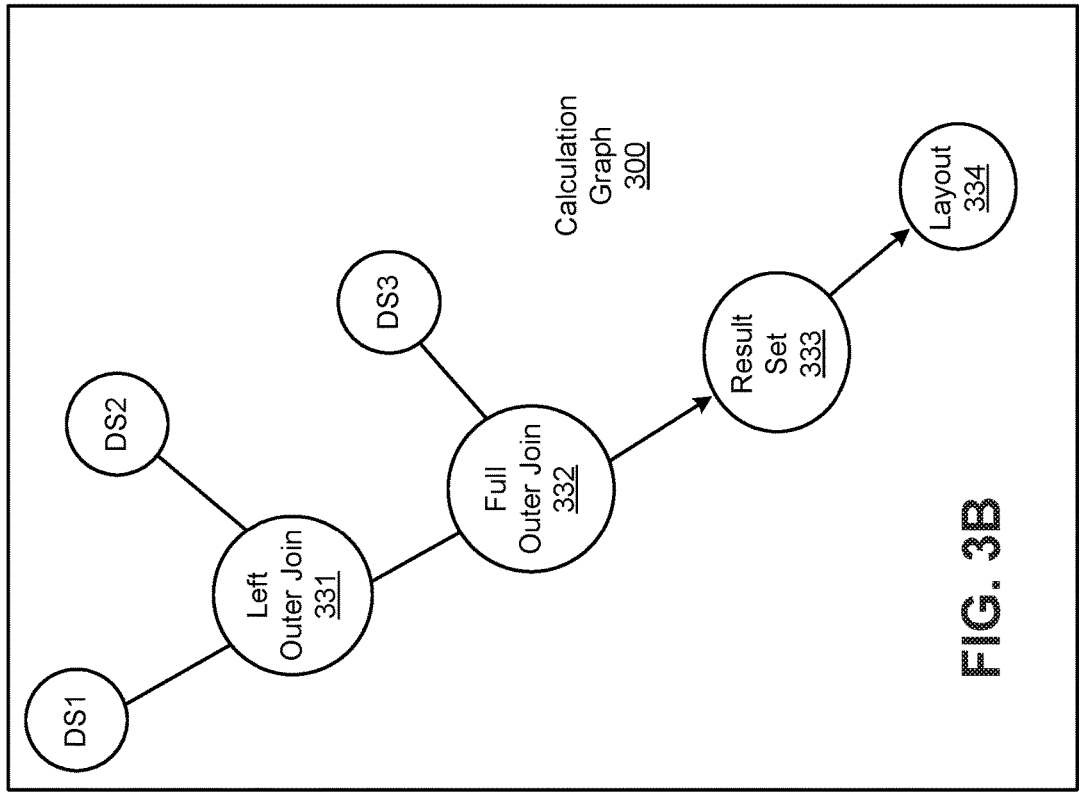
FIG. 3B depicts an example calculation graph generated during a data blend operation according to at least certain embodiments described herein.
Figure 3A:
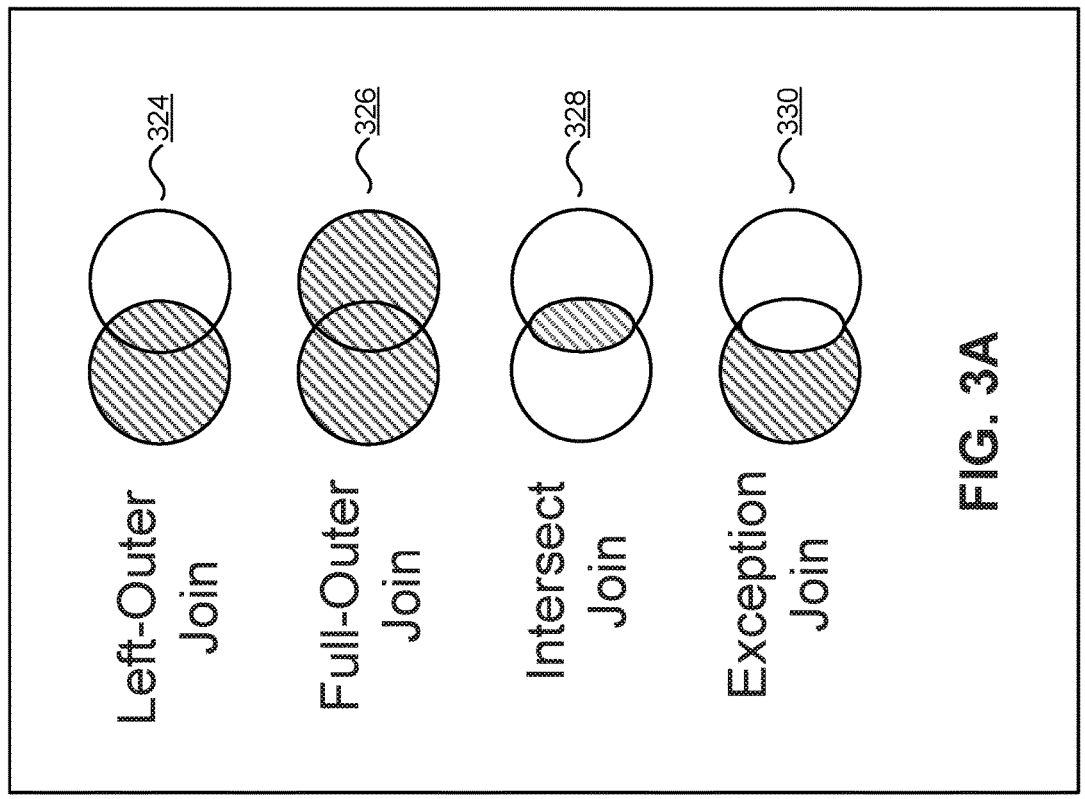
FIG. 3A depicts a graphical representation of various join types that can be utilized for joining data in a data blend operation according to at least certain embodiments described herein.

FIG. 3A depicts a graphical representation of various join types that may be utilized for joining data in a data blend operation according to at least certain embodiments described herein. The data blend operation may be based on any specified join type including left-outer join 324, full-outer join 326, intersect join 328, or exception join 330. A left-outer join 324 is adapted to return objects from the primary data set (i.e., left-hand side of a join operation) and match them up with objects from the one or more secondary data sets (i.e., right-hand side), but add null values for objects that do not match. A full-outer join 326 is adapted to return the union of the objects in the columns of the primary data set with the objects in the columns of the one or more secondary data sets. An intersect join 328 is adapted to only return objects that are common between the blended data sets. An exception join 330 is adapted to only return objects that do not exist in the secondary data set(s).

In addition, more than one join type may be specified in a blend operation as shown in FIG. 3B, which depicts another example calculation graph generated during a data blend operation. In the illustrated embodiment, a data set DS1 is joined with a data set DS2 using a left-outer join operation to yield a left-outer join node 331 and data set DS1 is joined with a third data set DS3 using a full-outer join operation to yield a full-outer join node 332. The results of these operations can then be provided in result set node 333 and used to construct the layout node 334.

Figure 4:
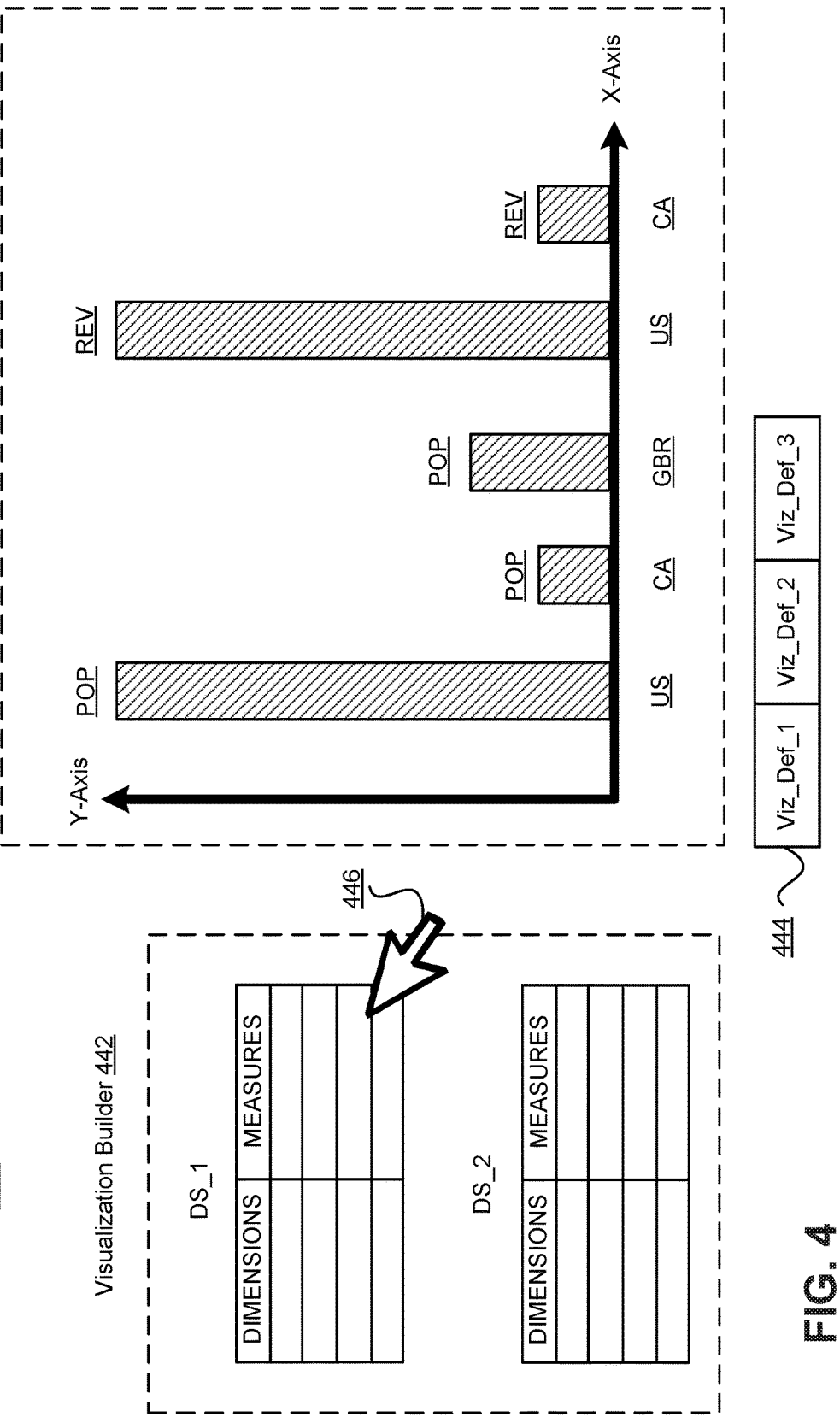
FIG. 4 depicts an example embodiment of a client graphical interface utilized for blending data according to the techniques described herein.

FIG. 4 depicts an example embodiment of a client graphical interface utilized for blending data according to the techniques described herein. Users can configure the visualization in a visualization tool at the client interface and this can be an iterative process. The visualization tool can be configured to join the data using a user-specified join type. Users can make changes to the visualization 440 and the data can be re-blended on the fly, creating resulting set data structures (e.g., tables) that are used to generate the results.

In the illustrated embodiment, client graphical interface 400 includes a visualization 440, a visualization builder 442, and a visualization tray 444. The visualization 440 may include any user-selectable chart or graph such as the bar chart as shown. The embodiment depicted in visualization 440 corresponds to the example shown in FIGS. 1-2 described above. When a user combines data or otherwise makes changes in the visualization 440 at the client interface 400, data blending operations can be triggered in the background transparent to the user. A query is generated at the client system and communicated to the back end server to retrieve data to be provided in response to update the visualization 440. Blending can be performed at the backend server based on queries sent from the client system when data sets are added to, or otherwise modified in, the visualization (e.g., bar graph, pie chart, etc.) based on user input to the visualization at the client interface 400.

The visualization 440 comprises the output chart or graph. The visualization comprises "dimensions" and "measures". As used herein, a "dimension" refers to the column in the primary data set that is being blended on and a "measure" refers to a value that can be aggregated for each dimension in the resulting visualization 440. In a pie chart, for example, the measures may be the area within the pie chart that would be divided up according to the dimensions. In a bar chart, on the other hand, the dimensions may be placed along the X-axis and the measures may be placed along the Y-axis. Measures may also be assigned an aggregation type such as sum, difference, average value, etc. Users can manually change the dimensions and measures in the visualization 440 at the client interface 400. When "city" is added into your columns, for example, a "city" dimension is added in the visualization 440.

Client interface 400 includes a visualization builder 442, which may comprise a display area adapted to enable users to visualize the data sets and their associated dimensions and measures that are available to be displayed in the visualization 440. The visualization builder 442 may also be a place where users can classify columns in the visualization as either dimensions or measures. In one embodiment, an automatic detect feature (not shown) may be provided to perform automatic classification detection on the data sets in visualization builder 442. The automatic classification detection can be configured to provide an initial determination as to how objects in the visualization should be classified. For example, every column that includes a number value may be initially detected as a measure. But that number may also be an identifier, which would make more sense for it to be a dimension. Users may manually reconfigure the classification of items as either dimensions or measures in the visualization builder 442.

The visualization builder 442 can be adapted to display any available dimensions and measures from a plurality of data sets that can be placed into the visualization 440. In the illustrated embodiment, visualization builder 442 includes dimensions and measures from a data set DS1 and dimensions and measures from a data set DS2. Visualization builder 442 is not limited to a particular number of data sets—additional available data sets can be included. Multiple data sets may be presented to the client as lists of dimensions and measures that can be selected (e.g., dragged and dropped into the chart) for the visualization 440.

Users can select one or more of the dimensions and measures from the available data sets in visualization builder 442 using, for example, a cursor 446 user input device. Cursor 446 can drag the dimensions and measures into the visualization 440. It should be noted, however, that other user input mechanisms may be utilized for performing this task, and the embodiments described herein are not limited to using a cursor or any other particular user data input device or mechanism. Users can add these items to the visualization in a number of different ways including using a double-click operation, using specific preconfigured keys (such as the +button), drop-down menus, etc.

When new dimensions or measures are dragged onto the visualization 440 (or otherwise selected), the visualization is updated accordingly, and the calculations for the data blend process may be triggered in the backend server transparent to the client system. The visualization type is user-configurable and may be changed in the visualization 440. The resulting information can be stored as a visualization definition (Viz_Def) in a visualization definition storage (e.g., local memory) at the client system. Each visualization definition may be displayed in the visualization tray 444.

The visualization tray 444 is adapted to display the different visualization definitions that have been generated. In the illustrated embodiment, the visualization tray 444 includes three visualization definitions Viz_Def_1, Viz_Def_2, and Viz_Def_3. Additional visualization definitions can be added using, for example, the plus button (+) on a user's keyboard, etc. Visualization definitions may also be modified in the visualization tray 444.

When a first object of a first data set is dragged from the visualization builder 442 into the visualization 440 (e.g., X/Y axes of a bar chart) at the client interface 400, the client system can be adapted to generate a visualization definition (e.g., Viz_Def_1) with the first data set, and this becomes the primary data set. During blending, the primary data set is the first data set that is placed in the visualization 440 at the client system. Users can then switch to a second data set in the display and drag the second data set into the visualization 440. The first data set placed in the chart 440 comprises the primary data set and every other data set that is subsequently added to the visualization comprises one or more secondary data sets. The secondary data sets are adapted to blend to the primary data set. The primary data set represents the left-hand side of a join operation (e.g., left-outer join), and the one or more secondary data sets represent the right-hand side of the join operation.

The resulting data structure may also indicate the particular type of data involved. For example, a visualization definition can designate that the dimension from a primary data set with a global identifier ID_1 (e.g., "country") is located on the X-axis and is linked with global identifiers ID_3 and ID_5 (e.g., "country" and "location", respectively) from one or more secondary data sets. The global identifiers are discussed in more detail below. Each visualization definition, Viz_Def_1, Viz_Def_2, and Viz_Def_3, in the visualization tray 444 may also indicate which measures are on the Y-axis (e.g., "population" and "revenue"), etc. In short, a visualization definition may include the data sets, the objects from the data sets to display, as well as the data set links. The global identifiers may also be input to the visualization definition in order to identify what data the global identifiers link to.

In order to blend data from two different data sets, a column can be identified to blend on (link the data). Classification can be performed on both dimensions and measures, but the dimensions (i.e., columns) are used for the linking. In blending, the names of the dimensions of the particular data sets do not need to be the exactly the same. For example, a "country" column from a first data set DS1 can be linked with a "location" column from a second data set DS2, etc. Identifying columns as linked together indicates to the system that they map together and can be considered the same. Although the match does not need to be 100%—it depends on the join type. Data set links are also stored in the visualization definition indicating which columns are linked.

The dimensions from each of the data sets are displayed to a user in the visualization 440 at the client interface 400. The visualization builder 442 is then adapted to receive user input linking one of the dimensions of the primary data set with a corresponding dimension(s) in the one or more second data sets. A new visualization definition can then be generated and stored in the visualization tray 444 at the client. In one embodiment, when a user desires to perform another blending operation, this linking does not need to be specified again because the system is designed to track objects in the data sets that are linked together.

The objects that are linked together are displayed in the client interface 400. The links indicates which columns are assigned to be the same. Based on this linking, the client system can be configured to automatically swap out the linked objects during execution. For example, the client system can be configured to automatically swap out "country" for "location," or vice versa. In one embodiment, the linked column name from the primary data set is the one that is displayed in the visualization.

Another difference between data merging and data blending relates to how data filtering is performed on the data sets. In blending, a user specifies what links exist between each pair of data sets involved in the operation. One or more filters can be applied to the data sets at the beginning of the data blending process to further specify what data is to be included in the resulting data set. One advantage of applying filters to the data sets involved in a blending operation is that it is not necessary for the data structures to include the same fields.

Figure 5A:
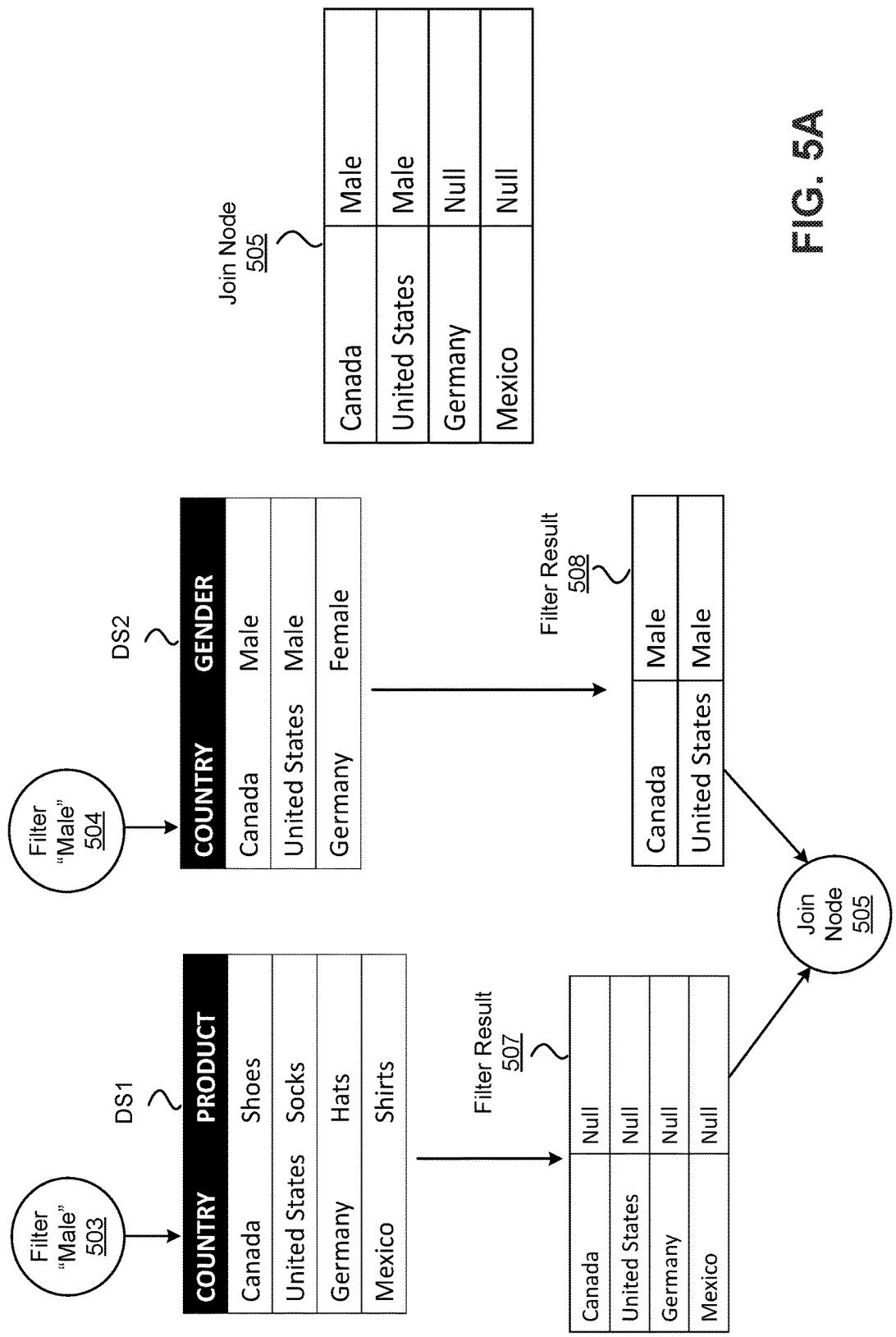
FIG. 5A depicts a block diagram of an example embodiment of direct filtering according to the techniques described herein.

FIG. 5A depicts a block diagram of an example embodiment of direct filtering according to the techniques described herein. Data filters can be applied on data sets at the beginning of a data blend operation to specify the particular columns to bring into the visualization. Direct filters can be applied on blended dimensions that are linked between two or more data sets. In the illustrated embodiment, a first data set DS1 is linked with a second data set DS2, where the linked dimension is specified as "country".

A first filter 503 specifying a data element "male" is applied to DS1 and a second filter 504 specifying the "male" data element is applied to DS2. In this example, both filter 503 and filter 504 are direct filters and are configured to filter each of the data sets DS1 and DS2 on the data element specified as "male" before the join operation is performed to obtain the data in join node 505. As shown in the diagram, the filter result set 508 from applying filter 504 on DS2 returns data elements "Canada" and "United States" since these were the data elements in DS2 that matched with the "male" data element that was filtered on. But the filter result set 507 from applying filter 503 on DS1, on the other hand, returns all the data elements "Canada", "United States", "Germany", and "Mexico" with each data element being associated with a "Null" data element since the data element "male" does not exist in data set DS1. When this occurs, the resulting data set in join node 505 includes values for "Canada" and "United States" from filtered data set DS2, but will include "Null" values from filtered data set DS1 since the data element "male" does not exist in data set DS1. This situation may arise when using a left-outer join or full-outer join type. Indirect filtering may be performed on the data sets before they are blended at the join node 505 to avoid this result.

Figure 5B:
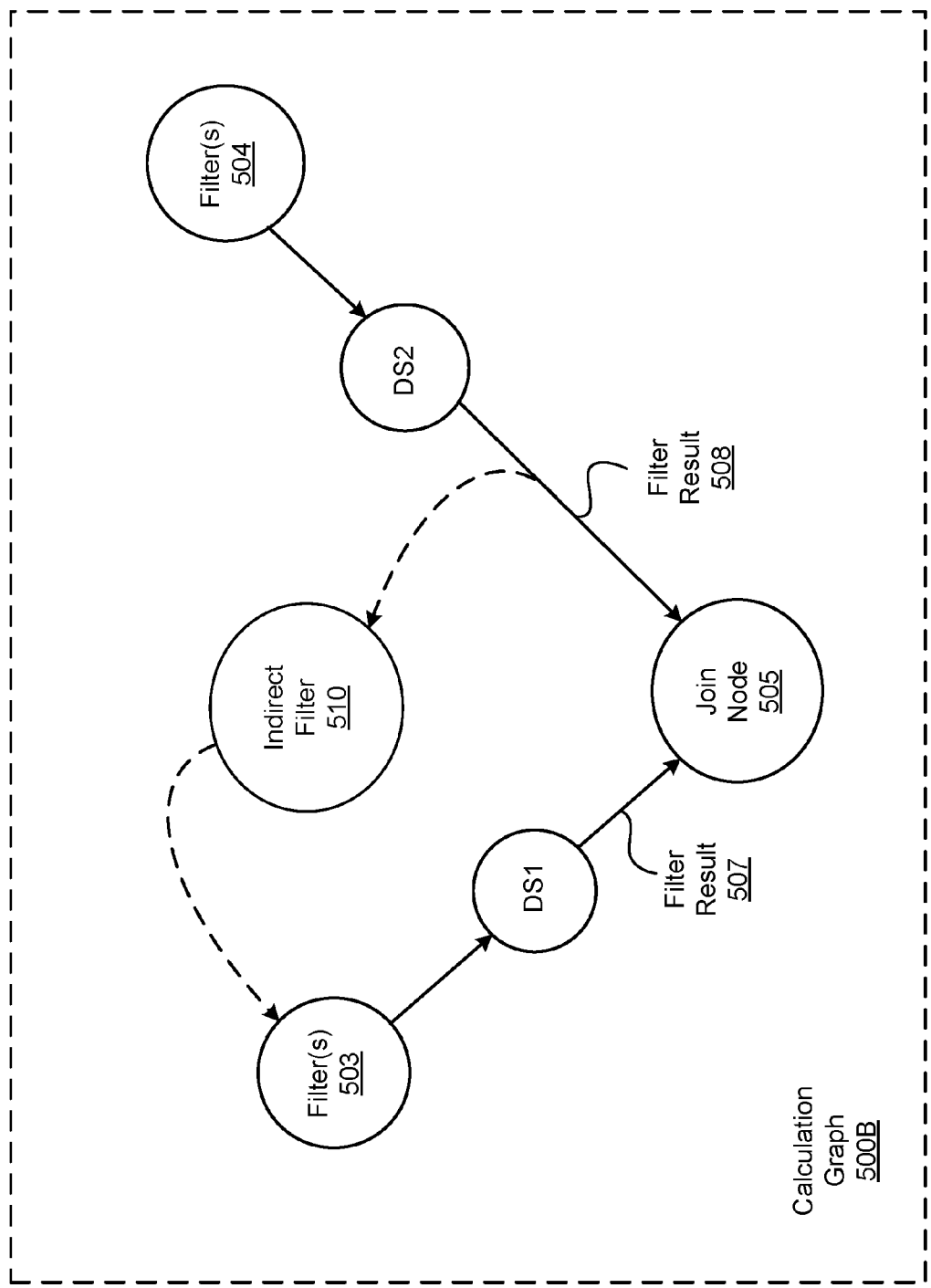
FIG. 5B depicts a block diagram of an example embodiment of a calculation graph showing the application of indirect filtering on data sets according to the techniques described herein.

FIG. 5B depicts a block diagram of an example embodiment of a calculation graph 500B showing the application of indirect filtering on data sets according to the techniques described herein. Indirect filtering may be used to remove unnecessary rows from the resulting data. This is shown conceptually in calculation graph 500B. In the illustrated embodiment, calculation graph 500B includes direct filters 503 and 504 for filtering data sets DS1 and DS2 respectively. The filter results 507 from applying filter 503 on data set DS1 and the filter results 508 from applying filter 504 on data set DS2 are then blended together at join node 505. In the case, however, when filtering is specified on data elements that are not linked on a blended dimension (e.g., on data elements not in the linked column(s)), an indirect filter 510 may be used to identify data elements in rows of the resulting filtered data corresponding to the blended dimension in a first data set, and then use the identified data elements in the resulting data set as the filtering criteria to be applied on the second data set in the data blending operation. The filtering criteria for indirect filter 510 may be obtained from the filter results 508 from data source DS2.

Figure 5C:
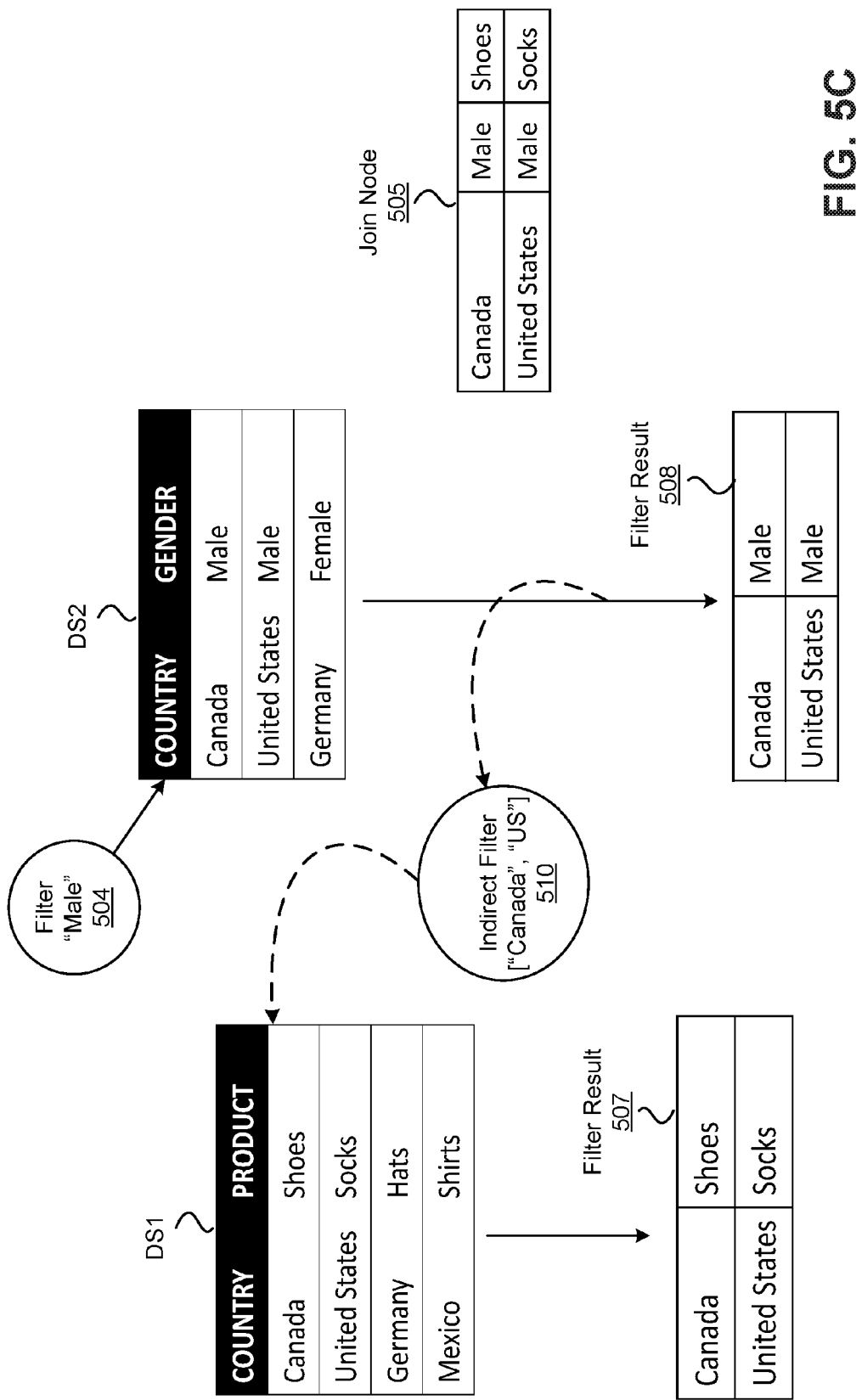
FIG. 5C depicts a block diagram of an example embodiment of indirect filtering according to the techniques described herein.

FIG. 5C depicts a block diagram of an example embodiment of indirect filtering according to an embodiment of the techniques described herein. Following with the previous example, in this embodiment data set DS2 is first filtered using direct filter 504 on the "male" data element. The filter result set 508 includes "Canada" and "United States" since both of these rows match with the "male" data element. The indirect filter 510 may then be established based on the filter result 508.

As shown, data set DS1 is linked with data set DS2 on "country". An indirect filter can be set up to filter data set DS1 when "country" is either "Canada" or "United States". The indirect filter 510 can be coded, for example, as follows: "Filter dataset DS1 where country is in ("Canada" "United States")." That filter for data set DS1 yields filter results 507 as shown in the diagram. In this case, indirect filter 510 applied to data set DS1 returned values for "country" that were in "Canada" or "United States" as well as their corresponding rows (assuming a left-outer join or full-join join type). The result of blending data sets DS1 and DS2 after the filtering has been applied is shown in join node 505.

Figure 5D:
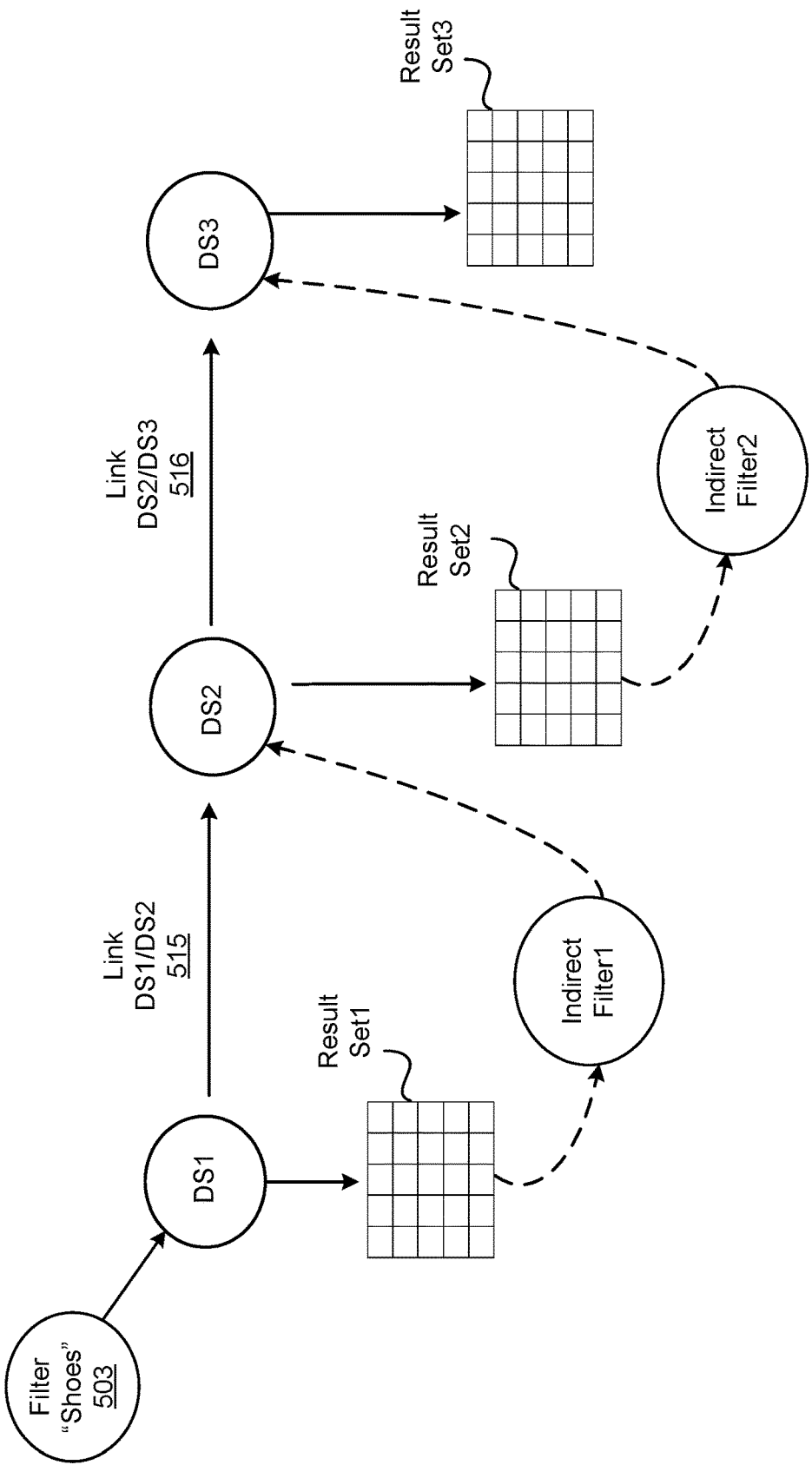
FIG. 5D depicts a block diagram of an example of indirect filtering according to an alternative embodiment of the techniques described herein.

FIG. 5D depicts a block diagram of an example of indirect filtering according to an alternative embodiment of the techniques described herein. In this illustrated embodiment, there are three data sources DS1, DS2 and DS3. DS1 and DS2 are linked together for the blend operation via a first data link 515 and DS2 and DS3 are linked together for the blend operation via second data link 516. Note, however, there is no link between data sets DS1 and DS3. Indirect filtering may be performed as long as there is one common link between the data sets.

In the illustrated embodiment, filter 503 is applied to data set DS1 to filter on "Shoes". This first filtering operation produces a result set1, which may then be used as the filtering criteria for a first indirect filter1 for filtering the second data set DS2. The first indirect filtering operation produces a second result set (result set2), which may then be used as the filtering criteria for a second indirect filter (indirect filter2) for filtering the third data set DS3 to obtain result set3.

An exclusion filter may also be used to exclude data elements. Exclusion filters work with "Not" statements. For example, an exclusion filter can be configured for filtering on everything that does not include the "male" data element. The columns in both data sets DS1 and DS2 that do not include the data element "male" can be returned in this filtering operation. Such an indirect filtering scheme can be coded, for example, as follows: "Select Product from Dataset1 where (country in (select country from Dataset 2 where gender is not 'Male') OR (COUNTRY not in (select country from dataset2))" to select the countries from dataset 1 that are not in dataset2.

FIG. 5E depicts a block diagram of an example embodiment of a calculation graph 500E showing the application of an exclusion filter in indirect filtering according to the techniques described herein. In this case, an exclusion filter 520 is applied to data sets DS1 and DS2 to filter on data elements in data set DS1 that are "not" in data set DS2 in addition to the filtering criteria applied from the filter result 508 resulting from applying the filter(s) 504 on data set DS2. As shown, the resulting filtered data set 527 from applying the exclusion filter 520 can then be combined with the filtering criteria of the indirect filter 510 using a logic "OR" statement in "OR" filter 523. In the example of FIG. 5C above, both "Germany" and "Mexico" can be returned using this configuration since these rows do not match with the data element "male" in the exclusion filtering criteria.

"AND" logic statements in "AND" filters can also be used. In fact, multiple filters can be applied to multiple different data sets and combined together using various logic statements. In the exclusion case above, a logic "OR" statement is used. For multiple indirect filters other than exclusion filters, logic "AND" statements may be used to further refine the resulting filtered data set. Other combinational logic statements may also be used. In addition, multiple levels of filtering and logic statements can be used to combine the output filtering results as desired. Nested filtering operations and combinations of exclusion filters and inclusion filters may also be utilized.

I. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, or by any combination of computer hardware and programmed computer components. The techniques described herein are not limited to any specific combination of hardware circuitry or software. Embodiments can also be practiced in distributed computing environments where operations are performed by remote data processing devices or systems that are linked through one or more wired or wireless networks.

Figure 6:
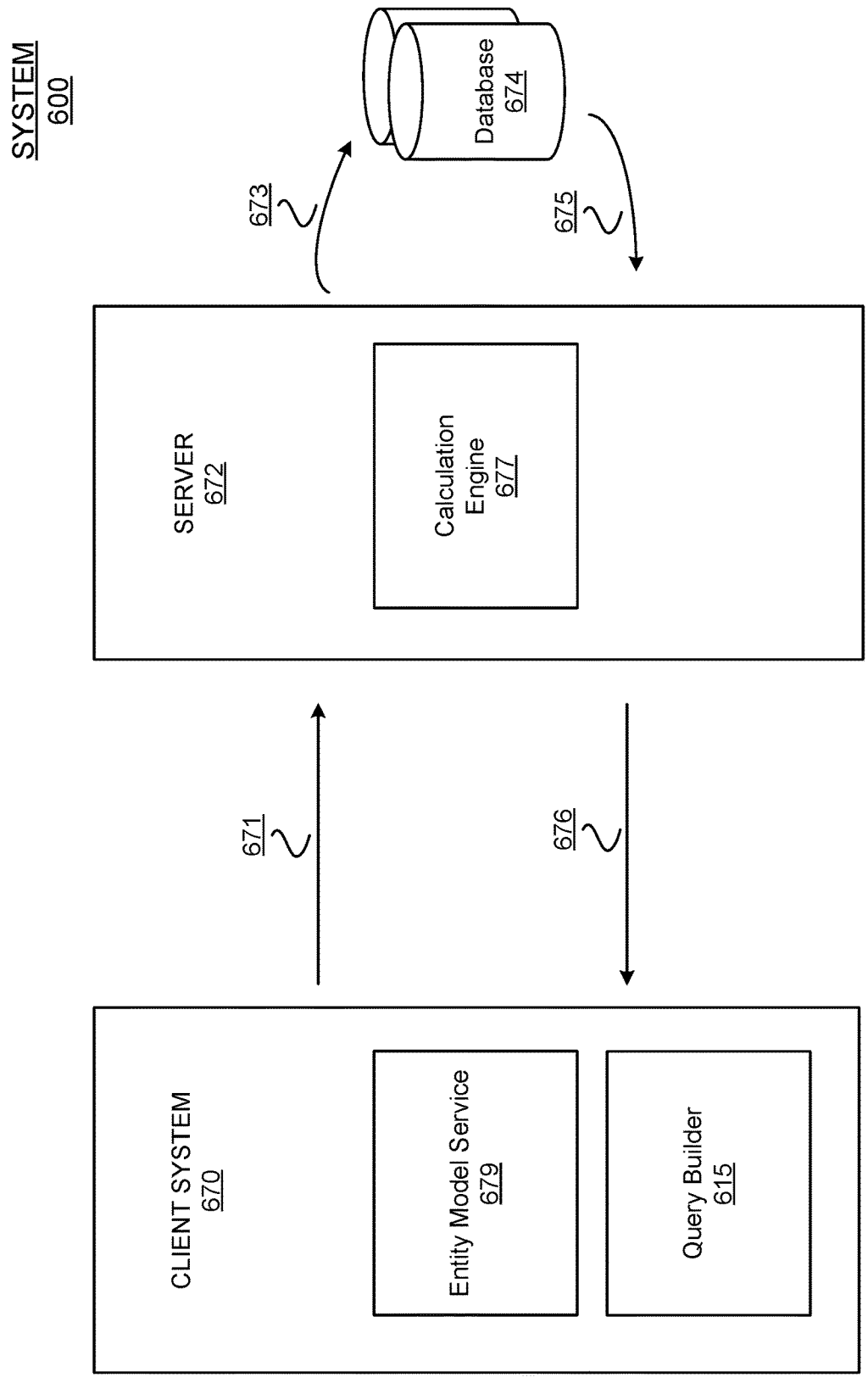
FIG. 6 depicts a block diagram of an example embodiment of a system for performing data blend operations according to the techniques described herein.

FIG. 6 depicts a block diagram of an example embodiment of a system for performing data blend operations according to the techniques described herein. As discussed above, any subsequent object added from the one or more second data sets into the visualization can trigger the data blend operation in the back end server. The visualization can then update accordingly, and provide a request containing the requisite information for the back end server to perform the data blending operation. The server can then construct the appropriate database queries based on the queries sent from the client system that include the global identifiers to retrieve the appropriate data from the database. After the operation completes, the visualization at the client interface can display the blended data from entities of the plurality of separate data sources.

In the illustrated embodiment, system 600 includes a client system 670 in communication with a server 672. The server 672 is in communication with a database 674. The client system includes an entity model service 679 and a query builder 615. After the dimensions and measures for multiple data sets from multiple different data sources have been pre-classified (either using the auto classification detection feature or manually by a user in the visualization builder 442), users can drag the pre-classified dimensions and measures into the visualization for display at the client interface. When this occurs, the query builder 615 at the client system 670 can generate a query 671 that is communicated to the back end server 672. In one embodiment, the query 671 may be implemented as an HTTP request communicated from the client 670 to the server 672. The query 671 may include a data structure model and global identifiers from an entity model service 679. The entity model service 679 is a client-side service module that is used to specify how to represent the columns in the visualization. The entity model service 679 provides the requisite metadata about the column names, the dimensions and measures of the columns, how the columns are aggregated, etc. The entity model service 679 also the provides unique global identifiers to support mapping across different data sources. As used herein, the term "entities" refers to people, places and things, etc.

The data structure models generated based on classifications at the client interface may be referred to as "consumption models". Each data set may include a consumption model. The consumption model includes the metadata necessary to classify objects in a data set. The backend server 672 keeps track of this metadata when it performs calculations to query the database 674. The metadata in a consumption model may define the dimensions and measures of the data set, how the dimensions and measures are aggregated, etc. When blending operations are conducted at the backend server 672, the consumption model may be used to link together multiple data sets.

The client system 670 may request a consumption model for a particular data set from the backend serer 672. The response returned by the backend server 672 may be used to indicate the fields that are available in the data set as well as which fields are dimensions and which are measures. The results also may include various fields in the data set for keys, hierarchies, and levels of hierarchies, etc. Hierarchies can be used by the backend server 672 to distinguish among objects in a data set. For example, the city Vancouver in the United States can be differentiated from the city Vancouver in Canada based on analyzing the hierarchies of the data set. The requested consumption model may be communicated back to the client system 670. It may contain information indicating what data is available to be queried, what data corresponds to which axes in the visualization at the client system, etc.

In a preferred embodiment, the entity model service 679 provides the references for the dimensions and measures of a data set, and provides a way of tracking this data. It also assigns global identifiers to objects in the consumption model. For example, if there are three different consumption models within a particular document corresponding to different data sets, each one of them can be assigned a global identifier that is unique across the multiple data sets within the document. The unique global identifiers can be provided on a consumption-model basis. When data blending is performed, objects can be associated with their corresponding data sets based on mapping identifiers. The entity model service 679 may be adapted to store the mapping between the global entity model service 679 global identifiers and the consumption model local identifiers for each visualization definition. In one embodiment, the identification mapping may be performed using a lookup table stored at the client system 670.

The global identifiers may be used in the queries 671 to determine what object in the data set to blend the data on (e.g., what column within the primary data set). In one embodiment, the query comprises a JSON object. During a data blend operation, the visualization definition and the entity model may be passed to the query builder 615. The query builder 615 takes the visualization definition and generates the query 671. The query builder 615 also translates the global identifiers in the entity model to local identifiers for the consumption model as it generates the query 671. The server 672 only understands the local consumption model identifiers. The query 671 is then sent to the server 672. The server 672 takes the query 671 and builds the calculation graph (see e.g., FIG. 1) within the calculation engine 677. The server 672 then executes the calculation graph and generates SQL statements to retrieve the requisite data from the database 674. The server 672 sends a database query 673 to the database 674 comprising the SQL statements. The database 674 then returns the requested data 675 via a query response 675.

The consumption model provides the metadata for multiple data sets needed for determining how to construct the queries 673 at the backend server 672. By utilizing the local consumption model identifiers, the backend server 672 can determine what values to access from the database 674 to be provided in the response 676 to the client system 670. For each column in a data set, there is therefore a corresponding global identifier. The consumption model metadata can also include metadata indicating the data set or object type, name, and any other requisite information needed to construct the database query 673.

The global identifiers provided by the entity model service 679 may be utilized to avoid collisions when the internal local identifiers of various objects within a data set are the same. For instance, if the join operation is performed on a "country" column identified as Column_1 in a first data set DS1 and a "country" column identified as Column_1 in a second data set DS2 within a particular document, the entity model service 679 assigns the global identifiers and provides the mapping to determine which country column is to be utilized in building the database queries 673. The global identifiers may be configured as a document-wide data structure. The metadata from each data set includes the global identifiers and the consumption model identifiers. Each of the columns in the consumption model designated by a column identifier in each of the data sets within a document can be mapped to a corresponding global identifier in the entity model service 679. The global identifiers may therefore be globally unique within a particular document. The global identifiers may then be stored in the visualization definition(s) at the client system 670 instead of storing the local identifiers.

It should be noted that the entity model service 679 may contain more than just data sources. The entity model service 679 may include a library of elements that can be placed in a visualization at the client interface. For example, an entity in entity model service 679 can map to a calculation. Algorithms or other calculations may also be the objects that are placed on axes in the visualization. These objects also get assigned a global identifier in the entity model service 679. A calculation, for example, may comprise adding two columns together to obtain a resulting column, etc. The definition of the calculation can be included in the database query 673. The blending and the corresponding calculations may be performed in a calculation engine 677 on the server 672. The query 673 contains the information needed for performing the blend operation. In one embodiment, the query comprises a stateless request that includes the data objects necessary to generate a results set in the response 676 to the client request 671. The resulting data set linking may include a data structure containing the global identifiers mapping to the columns from different data sets. This result set data structure may also be a runtime artifact.

The client system 670 can extract the metadata from the consumption models to perform the mapping from the consumption model local identifiers of specific columns in the data set to the entity model global identifiers. In constructing a query 671, the client system 670 translates the entity model service 679 global identifiers into the corresponding local data-source specific identifiers. The server 672 can use this metadata when it builds the database queries 673 to retrieve the requisite data from database 674 to respond to the client queries 671.

The inputs to the query builder 615 may include the visualization definitions and the global ID mapping from the entity model service. The query builder 615 may look at the visualization definition to determine what objects reside on the various axes in the visualization of the client display. The visualization definition also contains the relevant links for a particular visualization. The query 671 may also include a synchronization block (not shown), which comprises the mapping between columns (e.g., data set DS1/column1 maps to data set DS2/column2). The query 671 may comprise data source global identifiers to map the metadata from the consumption model. The consumption model may be located by looking up the global identifiers in the entity model service 679 to obtain the consumption models for a particular data source identifier. The synchronization block may be used to specify the primary data set and the one or more secondary data sets. The synchronization block may also indicate what columns to use during blending, as well as what the join type is. For each join pair, the join type and columns to link on may be specified. The synchronization block in the query 671 may specify a primary data structure and one or more secondary data structures; and for each secondary data structure, it may specify a join type and what columns from the primary and secondary data sets are linked together.

Example code for a query 671 constructed according to the novel techniques described herein is shown in Appendix 1 below. In the example shown in Appendix 1, the "Layout" section of the code for the query contains the definition of what goes on each axis in the resulting visualization at the client interface. "Axis 1" and "measureGroup1" are the axis names for the resulting visualization. The "dataQuery" section of the code specifies which data sources and entities from the data sources are of interest in the query. In the example in Appendix 1, the data sources 1 and 2 are named: "view:[_SYS_BIC][t.TEST.sap.kf.samples][KF_NILE_SALES_AV]" and
"view:[_SYS_BIC][t.TEST.sap.kf.samples][KF_YALP_REVIEWS_AV]", respectively.

The "Aggregation Types" section of the code for the query 671 may specify how to aggregate the measures for the blended columns. The "Synchronization" section of the code may specify how to blend the data sources together. The "joinCondition" in the synchronization section of the code may specify which columns to blend on and the "joinType" in the synchronization section of the code may specify which of the join types to use (i.e., left-outer join in this case).

The backend server 672 may then communicate the resulting data set back to the client system in response 676. In one embodiment, the response may be an HTTP response communicated from the server 672 to the client system 670. The results of data blending operations may comprise a result set data structure that exists during runtime and that is stored in a temporary memory location. In one embodiment, the result set data structure may comprise an SQL table.

The response 676 may also include layout information for formatting the resulting data to be rendered in the display at the client interface in the proper locations (e.g., the axes of a bar chart) in the selected visualization. In order to retrieve the appropriate results in response to the client query 671, the calculation engine 677 is adapted to parse the query 671, generate the calculation graph to perform the requisite mapping, generate SQL statements to perform the data retrieval, execute the SQL statements, and then provide the response 676 to the client system 670.

As will be appreciated by persons skilled in the art, the networks used for communicating among the client system 670, server 672 and database 674 can be implemented as any wired or wireless networks. In addition, the networks can be implemented as a single wired or wireless network or multiple separate networks in communication with one another. For example, the networks described herein can be implemented as a local area network ("LAN"), wide-area network ("WAN"), combination of LANs and WANs, the Internet, or any other type of communication network adapted for exchanging electronic messages and information. Further, the networks can be implemented as a physical array of hardware resources or as a virtual array, or any combination thereof. The networks can also be implemented in a cloud-based network configuration. For example, the networks can be implemented as public or private cloud network, or combination thereof. No specific network or network architecture should be interpreted as limiting the embodiments and techniques described herein.

Further, the server 672 may be in remote communication with the database 674 via one or more communication links. Alternatively, database 674 may be a component of the server 672 and configured to communicate with the server via an interconnect line or other direct or indirect connection or network. Database 674 may be implemented as any type of database system. One example embodiment includes a relational database system, in which data is stored in structured tables comprised of rows and columns. Access may be provided through data storage rules or schemas. Other examples of database systems include event-based systems where data can be stored in a semi-structured or unstructured format.

Figure 7:
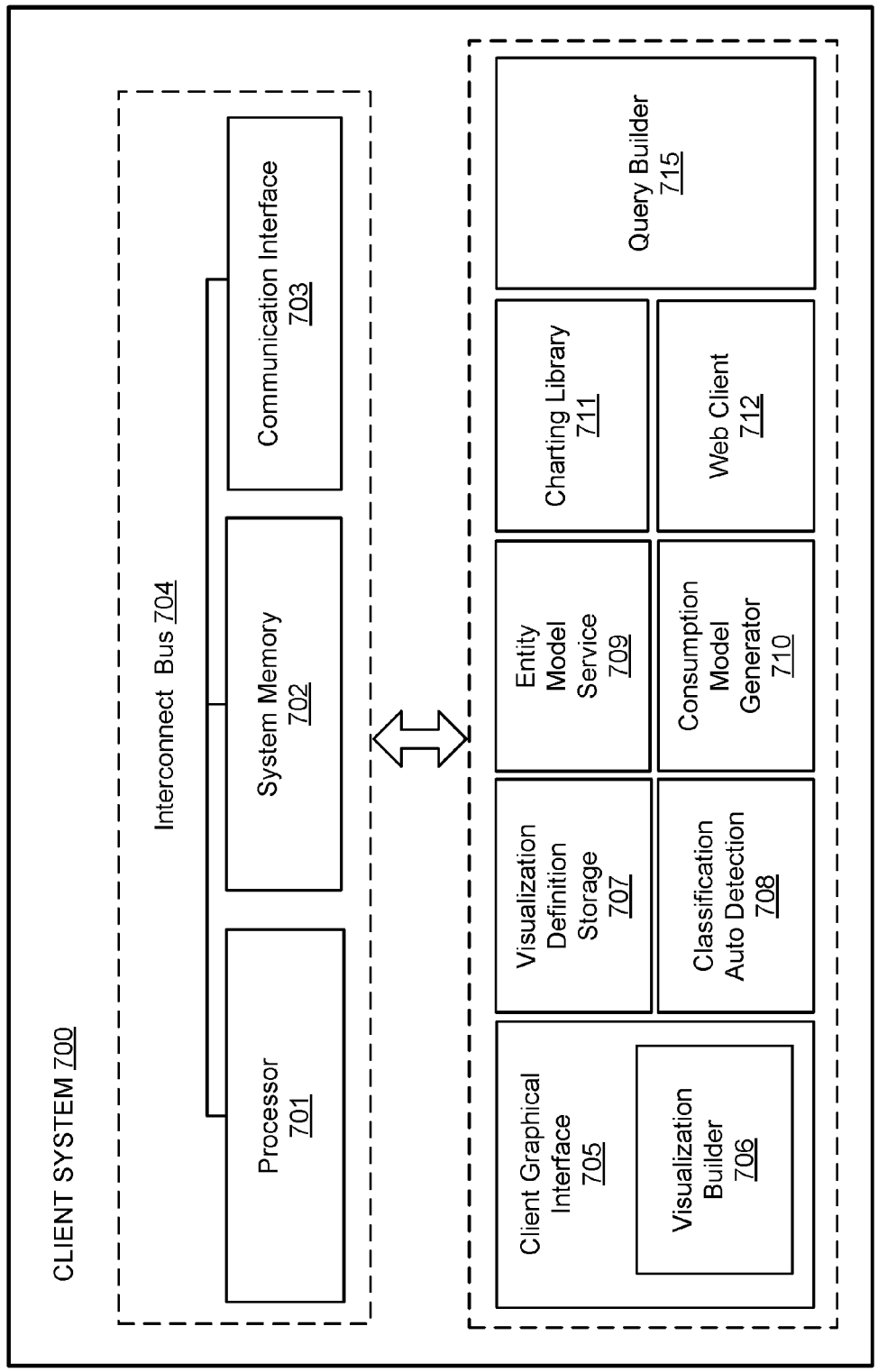
FIG. 7 depicts a block diagram of an example embodiment of a client system adapted for performing data blend operations according to the techniques described herein.

FIG. 7 depicts a block diagram of an example embodiment of a client system adapted for performing data blend operations according to the techniques described herein. In the illustrated embodiment, client system 700 includes a processor 701, system memory 702 and a communication interface 703 in communication together over an interconnect bus 704. Client system 700 further includes a client graphical interface 705 and a visualization builder 706 within the client interface. In another embodiment, the visualization builder 706 may be a separate feature or component. The client interface 705 may be used in conjunction with the visualization builder 706 to enable users to perform classification of the data sets as discussed above. The classifications can also be provided via the automatic classification feature using the classification auto detection unit 708. The classifications can also be configured manually via the client interface 705. The client interface 705 may be used to display the visualization tray and one or more visualizations as shown in FIG. 4 above.

Client system 700 includes a visualization definition storage area 707 adapted to store the visualization definitions for the blending operations. The visualization definition storage may be implemented as any type of memory or data storage device.

In the illustrated embodiment, the client system 700 further comprises an entity model service 709 to provide the entity models and mapping the entity model global identifiers assigned to the consumption model local identifiers as discussed above. The entity model service may include the mapping tables (not shown) configured for mapping the entity model service global identifiers to the consumption model local identifiers as discussed above. The client system 700 also includes a consumption model generator 710 for generating and storing the consumption models as discussed above.

Finally, the client system 700 also includes a charting library 711 configured for rendering the display in the visualization and a web client 712 to facilitate web communications and providing data to be displayed in the client interface 705.

Figure 8:
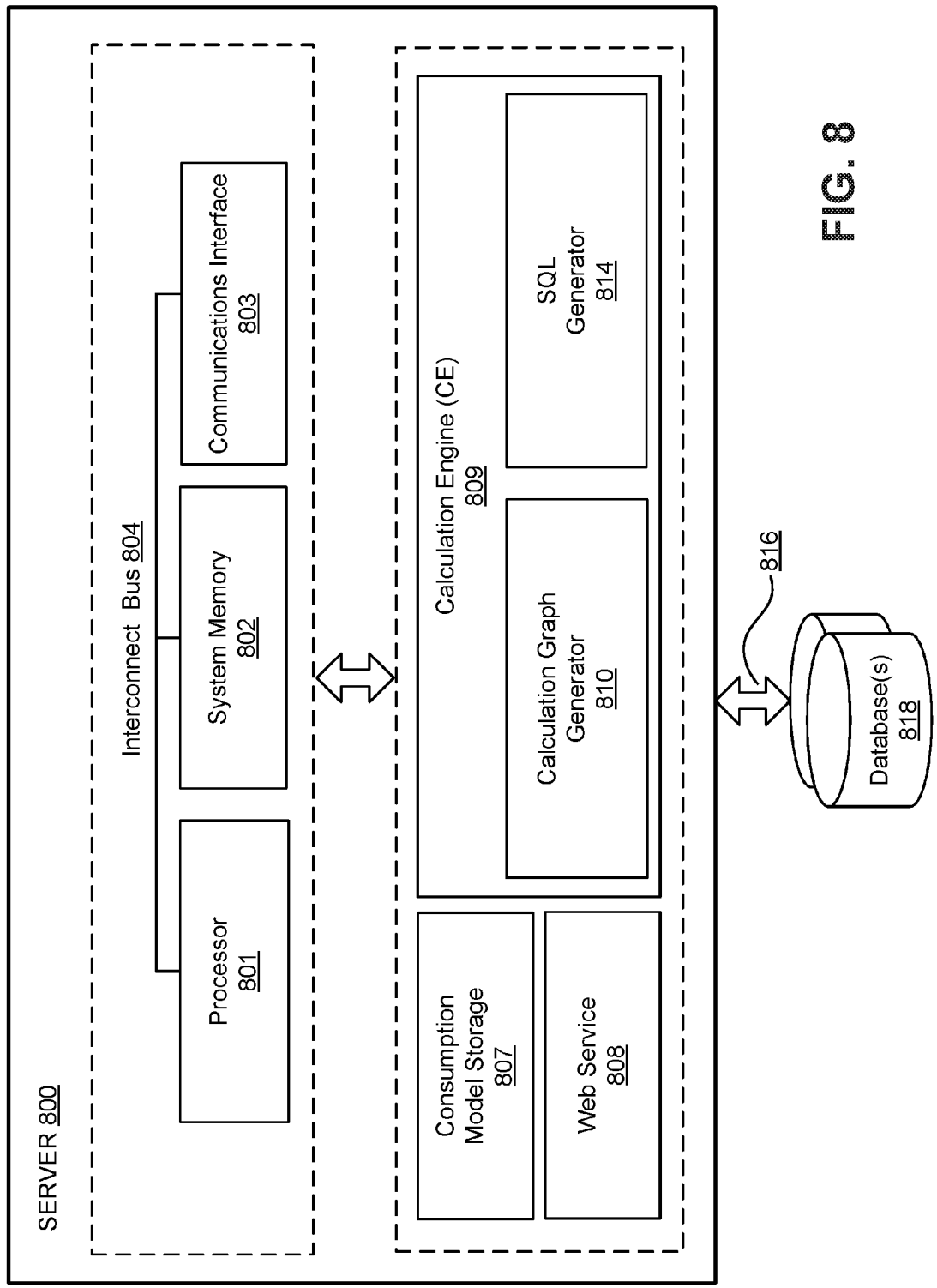
FIG. 8 depicts a block diagram of an example embodiment of a server computer adapted for performing data blend operations according to the techniques described herein.

FIG. 8 depicts a block diagram of an example embodiment of a server computer adapted for performing data blend operations according to the techniques described herein. In the illustrated embodiment, server 800 is in communication with one or more databases 818 via a communications link 816. Server 800 includes a processor 801, system memory 802 and a communication interface 803 in communication together over an interconnect bus 804. The server 800 further includes a consumption model storage unit 807 to store the consumption models and related metadata.

Server 800 includes a calculation engine 809 for performing the necessary calculations and to generate the calculation graph for data blend operations. In the illustrated embodiment, the calculation engine 809 includes a calculation graph generator 810 for generating the calculation graphs for data blending and an SQL generator 814 (or other query language generator) for generating and executing SQL statements to perform the data retrieval functions. Thus, the calculation engine 809 may be adapted to parse the client queries, generate a calculation graph using calculation graph generator 810 to perform the requisite mapping, and then utilize the SQL generator 814 to generate the SQL statements to perform the data retrieval. The calculation engine 809 may execute the SQL statements, and then provide the resulting data set retrieved from the database 818 to provide in its response to the client system.

Server 800 may be implemented as an individual computer hardware server, or as an array of computer servers physically or logically connected together and working in coordination to perform the functionality described herein. Generally, a data server includes a system that performs data operations with respect to data stored in one or more repositories of data. Depending on the type of data server, data operations may range from simple operations, such as storing and retrieving data, to more complex operations such as computing algorithms or calculating statistics based on the data; or arranging, modifying, or formatting the data.

II. Exemplary Processes

The following figures depict example flow charts illustrating various embodiments of a process for performing data blend operations according to the techniques described herein. It is noted that the processes described below are exemplary in nature and are provided for illustrative purposes and not intended to limit the scope of the disclosure to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 9A:
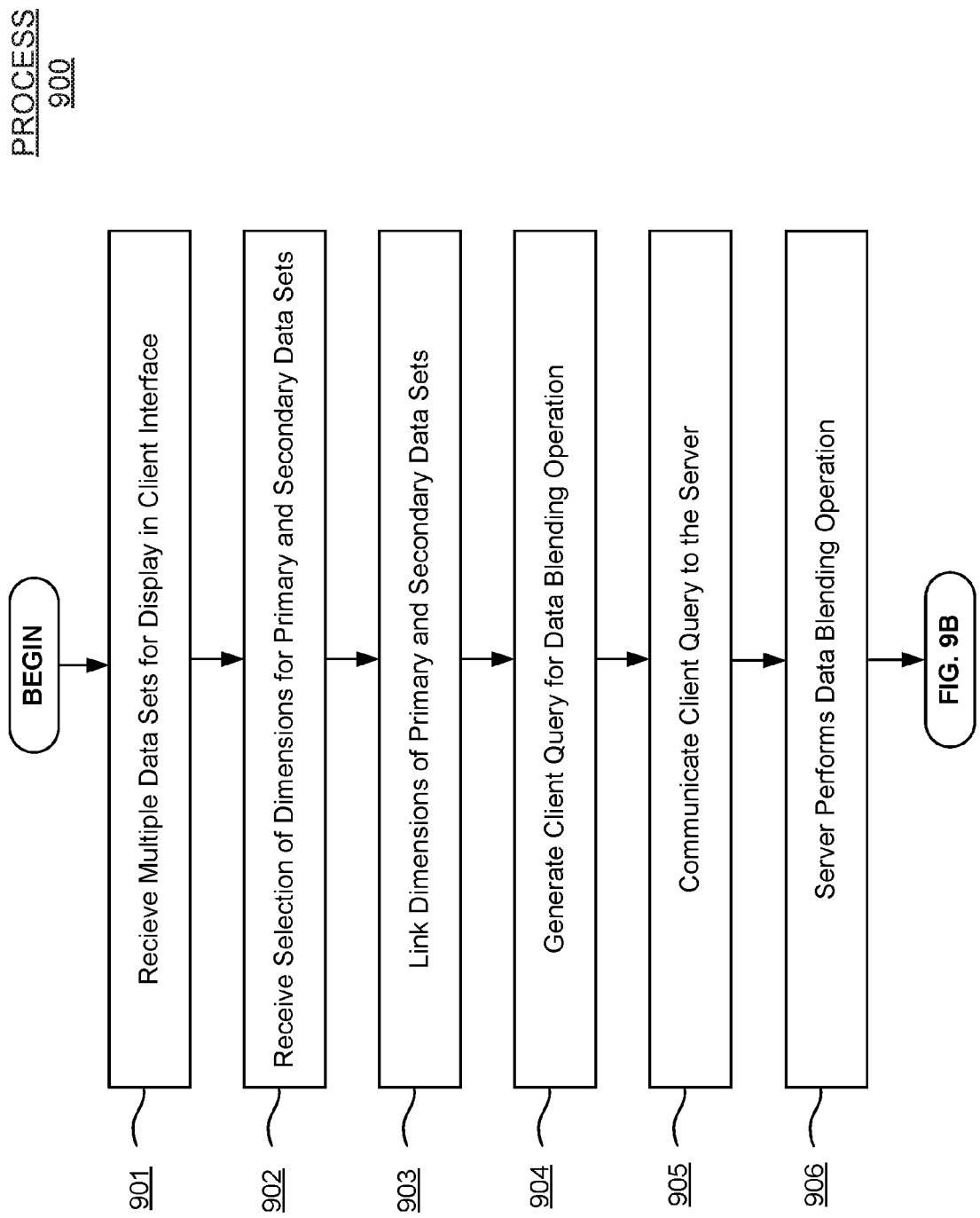

FIG. 9A depicts an example flow chart illustrating an embodiment of a process for performing data blend operations according to the techniques described herein. In the illustrated embodiment, process 900 begins by receiving multiple data sets to be displayed in a visualization (such as a chart or graph) in a client graphical interface of a client computer system (operation 901). The data sets may comprise data structures having one or more columns and one or more rows. In one embodiment, each column of each of the data sets is classified as either a dimension or a measure. As discussed above, a "dimension" refers to a column in the primary data set that is being blended on and a "measure" refers to a value that can be aggregated for each dimension in the resulting visualization. The columns of each data set may be classified manually or automatically using classification auto detection discussed above.

Process 900 continues by receiving input at the client interface selecting at least one dimension from the primary data set of the multiple data sets to be displayed in the visualization and selecting at least one dimension from one or more secondary data sets to be displayed in the visualization (operation 902). Process 900 continues by receiving input at the client interface linking the selected dimension of the primary data set with the selected dimensions of the one or more secondary data sets (operation 903).

Process 900 can then generate a query at the client system to perform a data blending operation on the dimensions of each of the one or more secondary data sets that are linked with the dimension of the primary data set (operation 904) and to communicate the client query to a backend server in communication with a database (operation 905). The server can then be configured to perform the data blending operation on the selected dimension of the primary data set and the selected dimensions of the one or more secondary data sets in response to the client query (operation 906). In one embodiment, the data blending operation includes generating a runtime artifact representing a calculation graph for the data blending operation, executing the calculation graph, generating SQL statements, and querying the database to retrieve a resulting data set. The data blending operation may comprise collapsing the dimensions of the one or more secondary data sets linked with the dimension of the primary data set into a blended column of a result set data structure and aggregating values of measures in rows of the blended column of the result set data structure.

The dimensions and measures of the blended column may be determined based on a designated join type. The join types may include a left-outer join, a full-outer join, an intersection join, or an exception join. Process 900 continues in FIG. 9B, which depicts an example flow chart illustrating an embodiment of a process for performing data blend operations according to the techniques described herein. Process 900 continues at operation 907 where the server is further configured to receive a query response from the database comprising the resulting data set. The server may then generate layout information for formatting the resulting data set to be rendered in the visualization at the client interface according to a selected visualization type (operation 908) and communicate a response to the client query containing the layout data (operation 909). This completes process 900 according to one example embodiment.

In at least certain embodiments, the data sets are subsets of an entire database table stored in the database. As discussed above, blending can be performed on any user-defined subset of the data tables used in the blend operation. In addition, a visualization definition may be generated for each resulting data set. The visualization definition may include the global identifiers associated with the dimensions and measures of the multiple data sets.

In one embodiment, one or more filters can be applied to one or more of the multiple data sets to specify which dimensions are to be displayed in the visualization. FIG. 10A depicts an example flow chart illustrating an embodiment of a process for performing indirect filtering in data blend operations according to the techniques described herein. In the illustrated embodiment, process 1000 begins by receiving input at a client interface of a client system linking a dimension of a first column of a first data set of a multiple data sets comprising a first data structure having one or more columns and one or more rows with a corresponding dimension of a second column of a second data set of the multiple data sets comprising a second data structure having one or more columns and one or more rows (operation 1001).

Process 1000 continues by applying a direct filter on the first data set to obtain a first filtered resulting data set specifying columns and rows resulting from applying the first filter (operation 1002), identifying data elements in the rows of the first filtered resulting data set that correspond to the dimension linking the first data set with the second data set (operation 1003), and applying an indirect filter on the second data set to obtain a second filtered resulting data set specifying columns and rows resulting from applying the indirect filter (operation 1004). The filtering criteria for the indirect filter may comprise the identified data elements in the rows of the first filtered resulting data set.

Process 1000 continues by communicating a client request to perform a data blend operation on the first filtered resulting data set and the second filtered resulting data set to a server computer in communication with a database (operation 1005). The server computer is then configured to perform the data blend operation on the first filtered resulting data set and the second filtered resulting data set in response to the client request (operation 1006).

The filtering criteria for the direct filter may be configured to filter data elements of the first data set that are not included in the first column linking the primary data set with the secondary data set. The direct filter and the indirect filter may be applied before the data blend operation is performed to specify which columns of the first data set and the second data set are to be displayed in a visualization at the client interface. One advantage of indirect filtering is that it enables removing unnecessary rows from the resulting data set of the data blend operation.

The data blend operation may include generating a run-time artifact representing a calculation graph that includes the first filtered resulting data set and the second filtered resulting data set. The filtering criteria for the indirect filter may be obtained from the first filtered resulting data set. In one embodiment, the direct filter may comprise an exclusion filter configured to exclude one or more data elements from the first filtered resulting data set.

Process 1000 continues at FIG. 10B, which depicts an example flow chart illustrating an embodiment of a process for performing indirect filtering in data blend operations according to the techniques described herein. In the illustrated embodiment, process 1000 continues by receiving input at the client interface linking a dimension of the second data set with a corresponding dimension of a third column of a third data set of the multiple sets comprising a third data structure having one or more columns and one or more rows (operation 1007). The dimension linking the second data set with the third data set may be different from the dimension linking the first data set with the second data set.

In the illustrated embodiment, process 1000 continues by identify data elements in rows of the second filtered resulting data set that correspond to the dimension linking the second data set with the third data set (operation 1008) and applying a second indirect filter on the third data set to obtain a third filtered resulting data set specifying columns and rows resulting from applying the second indirect filter (operation 1009). The filtering criteria for the second indirect filter may comprise the identified data elements in the rows of the second filtered resulting data set.

In the illustrated embodiment, process 1000 continues by communicating a second client request to perform a second data blend operation on the second filtered resulting data set and the third filtered resulting data set to a server computer in communication with a database (operation 1010). The server computer is then configured to perform the data blend operation on the second filtered resulting data set and the third filtered resulting data set in response to the second client request (operation 1011). In one embodiment, the first data set and the second data may be linked together via a first data link, and the second data set and the third data set may be linked together via a second data link. In one embodiment, no data link may exist between the first data set and the second data set. This completes process 1000 according to one example embodiment.

FIG. 11 depicts an example flow chart illustrating an embodiment of a process of data source identification mapping in data blending operations in accordance with the techniques described herein. In the illustrated embodiment, process 1100 begins by receiving input at a client interface of a client system selecting dimensions and measures from a primary data set of multiple data sets (operation 1101) and selecting a dimensions and measures from at least one secondary data set of the multiple data sets (operation 1102) to be displayed in a visualization in the client interface. In one embodiment, the client interface comprises a graphical display and one or more dimensions of the primary data set are linked with one or more dimensions of the secondary data set.

Process 1100 continues by generating a primary data structure model representing the selected dimensions and measures for the primary data set and generating a secondary data structure model representing the selected dimensions and measures for the secondary data set (operation 1103). In one embodiment, each dimension and measure in the primary and secondary data structure models includes a local identifier. Process 1100 then assigns global identifiers to each dimension and measure in the primary and secondary data structure models (operation 1104).

Process 1100 continues by generating a client query that contains the global identifiers as well as mapping information between the global identifiers and the local identifiers of the primary and secondary data structure models (operation 1105). The client query can then be communicated to a server in a backend system to perform the data blending operation on each selected dimension of the primary data set that is linked with one or more dimensions of the secondary data set in response to the input (operation 1106). This completes process 1100 according to one example embodiment.

The server is configured to access a database to retrieve a resulting data set in response to the data blending operation and return the resulting data set to the client system for rendering the visualization in the client interface. In one embodiment, each of the global identifiers is unique across the plurality of data sets. The server determines which data to include in the resulting data set based on the mapping information between the global identifiers and the local identifiers of the primary and secondary data structure models.

In one embodiment, the data blending operation includes generating a runtime artifact representing a calculation graph for the data blending operation. The data blending operation may be performed in a background process transparent to a user at the client interface without requiring unique values for the dimensions or measures of the primary and secondary data sets and without processing an entire database table for each of the primary and secondary data sets. The visualization at the client interface may be updated based on data provided by the server in response to the client query.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

FIG. 12 depicts an example overview block diagram of a data processing system upon which the embodiments described herein may be implemented. It is to be understood that a variety of computers configurations may be used to implement the described techniques. While FIG. 12 illustrates various components of a data processing system 1200, it is not intended to represent any particular architecture or manner of interconnecting components. It will also be appreciated that network computers and other data processing systems, which have fewer components or additional components, may be used. The data processing system 1200 may, for example, comprise a personal computer (PC), workstation, laptop computer, tablet, smartphone or other hand-held wireless device, or any device having similar functionality.

In the illustrated embodiment, data processing system 1200 includes a computer system 1210. Computer system 1210 includes an interconnect bus 1205 (or other communication mechanism for communicating information) and one or more processor(s) 1201 coupled with the interconnect bus 1205 for processing information. Computer system 1210 also includes a memory system 1202 coupled with the one or more processors 1201 via the interconnect bus 1205. Memory system 1202 is configured to store information and instructions to be executed by processor 1201, including information and instructions for performing the techniques described above. This memory system may also be used for storing programs executed by processor(s) 1201. Possible implementations of this memory system may be, but are not limited to, random access memory (RAM), read only memory (ROM), or combination thereof.

In the illustrated embodiment, a storage device 1203 is also provided for storing information and instructions. Typically storage device 1203 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 1203 may store source code, binary code, or software files for performing the techniques above. In addition, while FIG. 12 shows that storage device 1203 as a local device connected with the components of the data processing system, it will be appreciated by skilled artisans that the described techniques may use a storage device remote from the system, such as a database or other network storage device coupled with the computer system 1210 through a network interface such as network interface 1204.

Network interface 1204 may provide communications between computer system 1210 and a network 1220. The network interface 1204 may be a wireless or wired connection, or any combination thereof. Computer system 1210 is configured to send and receive information through the network interface 1204 across one or more networks 1220 such as a local area network (LAN), wide-area network (WAN), wireless or Bluetooth network, or the Internet 1230, etc. Computer system 1210 may access data and features on systems residing on one or multiple different hardware servers 1231-1234 across the network 1220. Hardware servers 1231-1234 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 1210 may be coupled via interconnect bus 1205 to a display 1212 for displaying information to a computer user. An input device 1211 such as a keyboard, touchscreen, and/or mouse is coupled to bus 1205 for communicating information and command selections from the user to processor 1201. The combination of these components allows the user to communicate with the system. In some systems, bus 1205 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

APPENDIX 1

EXAMPLE CLIENT QUERY WITH SYNCHRONIZATION BLOCK

```
{
  "layout": {                                              //Layout section
    "axis1": {                                             //Axis 1 (First Axis Name)
      "axisType": "categorical"
      "page": 0,
      "pageSize": 500000,
      "components": [{
        "id": {
          "id": "PRODUCTNAME",
          "type": "dimension",
          "parentKey": {
            "id": "view:[_SYS_BIC][t.TEST.sap.kf.samples]
            [KF_NILE_SALES_AV]"
            "type": "dataset"
          }
        }
      }]
    },
    "measureGroup1": {                                     //Measure Group 1 (Second Axis Name)
      "axisType": "numerical",
      "components": [{
        "id": {
          "id": "REVSCORE",
          "type": "member",
          "parentKey": {
          "id": "CustomDimension1",
          "type": "dimension",
          "parentKey": {
            "id": "view:[_SYS_BIC][t.TEST.sap.kf.samples]
            [KF_YALP_REVIEWS_AV]"
            "type": "dataset"
          }
         }
        }
      },
      {
        "id": {
          "id": "SALES",
          "type": "member",
          "parentKey": {
            "id": "CustomDimension1",
            "type": "dimension",
            "parentKey": {
              "id": "view:[_SYS_BIC][t.TEST.sap.kf.samples]
              [KF_NILE_SALES_AV]"
              "type": "dataset"
            }
          }
        }
      }]
    }
  },
  "dataQuery": {                                           //Data Query Section
    "dataSources": [{
      "id": {
        "id": "view:[_SYS_BIC][t.TEST.sap.kf.samples]      //Data Source_1
        [KF_NILE_SALES_AV]",
        "type": "dataset"
      },
      "info": {
        "id": {
          "id": "view:[_SYS_BIC][t.TEST.sap.kf.samples][KF_NILE_SALES_AV]",
          "type": "dataset"
        }
      },
```

APPENDIX 1-continued

EXAMPLE CLIENT QUERY WITH SYNCHRONIZATION BLOCK

```
    "entities": [{
      "analyticType": "dimension",
      "refId": {
        "id": "PRODUCTNAME",
        "type": "dimension",
        "parentKey": {
          "id": "view:[_SYS_BIC][t.TEST.sap.kf.samples][KF_NILE_SALES_AV]",
          "type": "dataset"
        }
      },
      "id": {
        "id": "PRODUCTNAME",
        "type": "dimension",
        "parentKey": {
          "id": "view:[_SYS_BIC][t.TEST.sap.kf.samples][KF_NILE_SALES_AV]",
          "type": "dataset"
        }
      },
      "key": {
        "id": "PRODUCTNAME"
      },
      "attributes": {
        "value": {
          "id": "PRODUCTNAME"
        }
      }
    },
    {
      "analyticType": "measure",
      "id": {
        "id": "SALES",
        "type": "member",
        "parentKey": {
          "id": "CustomDimension1",
          "type": "dimension",
          "parentKey": {
            "id": "view:[_SYS_BIC][t.TEST.sap.kf.samples][KF_NILE_SALES_AV]",
            "type": "dataset"
          }
        }
      },
      "refId": {
        "id": "SALES",
        "type": "member",
        "parentKey": {
          "id": "CustomDimension1",
          "type": "dimension",
          "parentKey": {
            "id": "view:[_SYS_BIC][t.TEST.sap.kf.samples][KF_NILE_SALES_AV]",
            "type": "dataset"
          }
        }
      },
      "aggregationType": "sum",                              //Aggregation Type
      "key": {
        "id": "SALES"
      }
    }
  ],
  "filters": [ ],
  "inputParameters": [ ]
},
{
  "id": {
    "id": "view:[_SYS_BIC][t.TEST.sap.kf.samples]           //Data Source 2
  [KF_YALP_REVIEWS_AV]",
    "type": "dataset"
  },
  "info": {
    "id": {
      "id": "view:[_SYS_BIC][t.TEST.sap.kf.samples][KF_YALP_REVIEWS_AV]",
      "type": "dataset"
    }
  },
```

APPENDIX 1-continued

EXAMPLE CLIENT QUERY WITH SYNCHRONIZATION BLOCK

```
"entities": [{
  "analyticType": "measure",
  "id": {
    "id": "REVSCORE",
    "type": "member",
    "parentKey": {
      "id": "CustomDimension1",
      "type": "dimension",
      "parentKey": {
        "id": "view:[_SYS_BIC][t.TEST.sap.kf.samples]
               [KF_YALP_REVIEWS_AV]",
        "type": "dataset"
      }
    }
  },
  "refId": {
    "id": "REVSCORE",
    "type": "member",
    "parentKey": {
      "id": "CustomDimension1",
      "type": "dimension",
      "parentKey": {
        "id": "view:[_SYS_BIC][t.TEST.sap.kf.samples]
               [KF_YALP_REVIEWS_AV]",
        "type": "dataset"
      }
    }
  },
  "aggregationType": "sum",                              //Aggregation Type
  "key": {
    "id": "REVSCORE"
  }
},
{
  "analyticType": "dimension",
  "refId": {
    "id": "PRODUCT_NAME",
    "type": "dimension",
    "parentKey": {
      "id": "view:[_SYS_BIC][t.TEST.sap.kf.samples]
             [KF_YALP_REVIEWS_AV]",
      "type": "dataset"
    }
  },
  "id": {
    "id": "PRODUCT_NAME",
    "type": "dimension",
    "parentKey": {
      "id": "view:[_SYS_BIC][t.TEST.sap.kf.samples]
             [KF_YALP_REVIEWS_AV]",
      "type": "dataset"
    }
  },
  "key": {
    "id": "PRODUCT_NAME"
  },
  "attributes": {
    "value": {
      "id": "PRODUCT_NAME"
    }
  }
}],
"filters": [ ],
"inputParameters": [ ]
}],
"synchronization": {                                    //Synchronization section
  "primary": {
    "id": {
      "id": "view:[_SYS_BIC][t.TEST.sap.kf.samples]
             [KF_NILE_SALES_AV]",
      "type": "dataset"
    }
  },
```

APPENDIX 1-continued

EXAMPLE CLIENT QUERY WITH SYNCHRONIZATION BLOCK

```
"secondaries": [{
    "id": {
        "id": "view:[_SYS_BIC][t.TEST.sap.kf.samples]
        [KF_YALP_REVIEWS_AV]",
        "type": "dataset"
    },
    "joinCondition": {                                              //Join Condition
        "primaryAttributes": [{
            "id": "PRODUCTNAME",
            "type": "dimension",
            "parentKey": {
                "id": "view: [_SYS_BIC][t.TEST.sap.kf.samples][KF_NILE_SALES_AV]",
                "type": "dataset"
            }
        }],
        "secondaryAttributes": [{
            "id": "PRODUCT_NAME",
            "type": "dimension",
            "parentKey": {
                "id": "view: [_SYS_BIC][t.TEST.sap.kf.samples][KF_YALP_REVIEWS_AV]",
                "type": "dataset"
            }
        }]
    },   joinType: "leftOuter"
    }]
    }
},
"properties": {
    "computeRanges": false,
    "computeDistinctCount": false,
    "facetCount": false,
    "maxDataPoints": 500000
    }
}
```

What is claimed is:

1. A method comprising:

receiving input, at a client interface comprising a graphical display of a client system, selecting a dimension or measure from a primary data set of a plurality of data sets and selecting a dimension or measure from at least one secondary data set of the plurality of data sets to be displayed in a visualization in the client interface, wherein one or more dimensions of the primary data set are linked with one or more dimensions of the secondary data set;

generating a primary data structure model representing the selected dimensions and measures for the primary data set and a secondary data structure model representing the selected dimensions and measures for the secondary data set, wherein each dimension and measure in the primary data structure model and the secondary data structure model includes a local identifier;

assigning a global identifier to each dimension and measure in the primary data structure model and the secondary data structure model;

generating a client query comprising the global identifiers and mapping information between the global identifiers and the local identifiers of the primary and secondary data structure models; and communicating the client query to a server, wherein the server is configured to perform a data blending operation on each selected dimension of the one or more dimensions of the primary data set that is linked with the one or more dimensions of the secondary data set in response to the input, the primary data set stored in a database external to the server, and wherein the server is further configured to, in response to the data blending operation, temporarily store in a local memory for a lifecycle of the client query, a resulting data set that is not stored in the database, and return the resulting data set to the client system for rendering the visualization in the client interface.

2. The method of claim 1 wherein the server determines which data to include in the resulting data set based on the mapping information between the global identifiers and the local identifiers of the primary and secondary data structure models.

3. The method of claim 1 wherein each of the global identifiers is unique across the plurality of data sets.

4. The method of claim 1 wherein the data blending operation includes generating a runtime artifact representing a calculation graph for the data blending operation.

5. The method of claim 1 wherein the data blending operation is performed without requiring unique values for the dimensions or measures of the primary and secondary data sets.

6. The method of claim 1 wherein the mapping information includes a look-up table.

7. The method of claim 1 wherein the data blending operation is performed without processing an entire database table for each of the primary and secondary data sets.

8. The method of claim 1 wherein the data blending operation is performed in a background process transparent to a user at the client interface.

9. The method of claim 1 further comprising updating the visualization in the client interface based on data provided by the server in response to the client query.

10. A system comprising:
a server in communication with a database;
a computer system in communication with the server over a network, the computer system comprising a processor and a system memory in communication with the processor via a communication medium, the system memory configured to store programmed computer code, which when executed by the processor, causes the processor to perform data blending operations comprising:
receiving input, at a client interface comprising a graphical display of a client system, selecting a dimension or measure from a primary data set of a plurality of data sets and selecting a dimension or measure from at least one secondary data set of the plurality of data sets to be displayed in a visualization in the client interface, wherein one or more dimensions of the primary data set are linked with one or more dimensions of the secondary data set;
generating a primary data structure model representing the selected dimensions and measures for the primary data set and a secondary data structure model representing the selected dimensions and measures for the secondary data set, wherein each dimension and measure in the primary data structure model and the secondary data structure model includes a local identifier;
assigning a global identifier to each dimension and measure in the primary data structure model and the secondary data structure model;
generating a client query comprising the global identifiers and mapping information between the global identifiers and the local identifiers of the primary and secondary data structure models; and
communicating the client query to a server, wherein the server is configured to perform a data blending operation on each selected dimension of the one or more dimensions of the primary data set that is linked with the one or more dimensions of the secondary data set in response to the input, the primary data set stored in a database external to the server, and wherein the server is further configured to,
in response to the data blending operation, temporarily store in a local memory for a lifecycle of the client query, a resulting data set that is not stored in the database, and
return the resulting data set to the client system for rendering the visualization in the client interface.

11. The system of claim 10 wherein the server determines which data to include in the resulting data set based on the mapping information between the global identifiers and the local identifiers of the primary and secondary data structure models.

12. The system of claim 10 wherein the data blending operation includes generating a runtime artifact representing a calculation graph for the data blending operation.

13. The system of claim 10 wherein the data blending operation is performed without requiring unique values for the dimensions or measures of the primary and secondary data sets.

14. The system of claim 10 wherein the mapping information includes a look-up table.

15. The system of claim 10 wherein the operations further comprise generating a visualization definition for the resulting data set comprising the global identifiers.

16. A non-transitory computer readable storage medium embodying programmed computer code, which when executed by a computer system, causes the computer system to perform operations comprising:
receiving input, at a client interface comprising a graphical display of a client system, selecting a dimension or measure from a primary data set of a plurality of data sets and selecting a dimension or measure from at least one secondary data set of the plurality of data sets to be displayed in a visualization in the client interface, wherein one or more dimensions of the primary data set are linked with one or more dimensions of the secondary data set;
generating a primary data structure model representing the selected dimensions and measures for the primary data set and a secondary data structure model representing the selected dimensions and measures for the secondary data set, wherein each dimension and measure in the primary data structure model and the secondary data structure model includes a local identifier;
assigning a global identifier to each dimension and measure in the primary data structure model and the secondary data structure model;
generating a client query comprising the global identifiers and mapping information between the global identifiers and the local identifiers of the primary and secondary data structure models; and
communicating the client query to a server, wherein the server is configured to perform a data blending operation on each selected dimension of the one or more dimensions of the primary data set that is linked with the one or more dimensions of the secondary data set in response to the input, the primary data set stored in a database external to the server, and wherein the server is further configured to,
in response to the data blending operation, temporarily store in a local memory for a lifecycle of the client query, a resulting data set that is not stored in the database, and
return the resulting data set to the client system for rendering the visualization in the client interface.

17. The computer readable storage medium of claim 16 wherein each of the global identifiers is unique across the plurality of data sets.

18. The computer readable storage medium of claim 16 wherein the server determines which data to include in the resulting data set based on the mapping information between the global identifiers and the local identifiers of the primary and secondary data structure models.

19. The computer readable storage medium of claim 16 wherein the data blending operation is performed without requiring unique values for the dimensions or measures of the primary and secondary data sets.

* * * * *